US012613322B2

(12) United States Patent
Vienneau et al.

(10) Patent No.: US 12,613,322 B2
(45) Date of Patent: Apr. 28, 2026

(54) METHOD AND SYSTEM USING CODED EXCITATION WITH INVERTIBLE SKEW-SYMMETRIC BINARY SEQUENCES AND INVERSE FILTERING

(71) Applicant: VANDERBILT UNIVERSITY, Nashville, TN (US)

(72) Inventors: Emelina Prevost Vienneau, Walnut Cove, NC (US); Brett C. Byram, Brentwood, TN (US)

(73) Assignee: VANDERBILT UNIVERSITY, Nashville, TN (US)

( * ) Notice: Subject to any disclaimer, the term of this patent is extended or adjusted under 35 U.S.C. 154(b) by 402 days.

(21) Appl. No.: 18/024,315

(22) PCT Filed: Aug. 31, 2021

(86) PCT No.: PCT/US2021/048325
§ 371 (c)(1),
(2) Date: Mar. 2, 2023

(87) PCT Pub. No.: WO2022/051238
PCT Pub. Date: Mar. 10, 2022

(65) Prior Publication Data
US 2023/0258788 A1 Aug. 17, 2023

Related U.S. Application Data

(60) Provisional application No. 63/074,758, filed on Sep. 4, 2020.

(51) Int. Cl.
*G01S 7/52* (2006.01)
*G01S 15/10* (2006.01)
*G01S 15/89* (2006.01)

(52) U.S. Cl.
CPC ...... *G01S 7/52026* (2013.01); *G01S 7/52047* (2013.01); *G01S 15/104* (2013.01); *G01S 15/8961* (2013.01); *G01S 15/8979* (2013.01)

(58) Field of Classification Search
CPC .. G01S 7/52026; G01S 7/52047; G01S 15/04; G01S 15/8961; G01S 15/8979; G01S 7/527

(Continued)

(56) References Cited

U.S. PATENT DOCUMENTS 6,146,328 A    11/2000   Chiao et al.
6,155,980 A  *   12/2000   Chiao ................. G01S 15/8959
                      600/447

(Continued)

OTHER PUBLICATIONS

Ruprecht et al. ("On the search for good aperiodic binary invertible sequences." IEEE Transactions on Information Theory 42.5 (1996): 1604-1612.) (Year: 1996).*

(Continued)

*Primary Examiner* — Yuqing Xiao
*Assistant Examiner* — Christopher Richard Walker
(74) *Attorney, Agent, or Firm* — troutman pepper locke; Tim Tingkang Xia, Esq.

(57) ABSTRACT

One aspect of the invention relates to method and system for increasing signal-to-noise ratio (SNR) and suppressing range lobe artifacts in ultrasound imaging or sensing, active sonar, LIDAR, and/or radar. The method includes forming a coded excitation waveform with a chip waveform and a binary sequence; transmitting the coded excitation waveform into a medium of interest, and receiving signals generated from the medium of interest responsive to excitation of the coded excitation waveform; and performing pulse compression on the received signals using a decoding filter to increase the SNR and suppress the range lobe artifacts.

51 Claims, 13 Drawing Sheets

(58) Field of Classification Search
USPC .............................................................. 367/7
See application file for complete search history.

(56) References Cited

U.S. PATENT DOCUMENTS

| | | | |
|---|---|---|---|
| 8,928,524 B1 | 1/2015 | Nunn et al. | |
| 2007/0038108 A1* | 2/2007 | Hao ......................... | A61B 8/06 |
| | | | 600/454 |
| 2009/0289836 A1 | 11/2009 | Frank et al. | |
| 2016/0065323 A1* | 3/2016 | Zemp ...................... | G01S 13/90 |
| | | | 342/25 A |
| 2016/0213258 A1 | 7/2016 | Lashkari et al. | |
| 2016/0331353 A1* | 11/2016 | Ralston .................. | A61B 8/546 |
| 2020/0107815 A1 | 4/2020 | Chiang et al. | |

OTHER PUBLICATIONS

Zhao et al. ("Barker-coded ultrasound color flow imaging: Theoretical and practical design considerations." IEEE transactions on ultrasonics, ferroelectrics, and frequency control 54.2 (2007): 319-331.) (Year: 2007).*

Gran et al. ("Coded ultrasound for blood flow estimation using subband processing." IEEE transactions on ultrasonics, ferroelectrics , and frequency control 55.10 (2008): 2211-2220.) (Year: 2008).*

Lu et al. ("Method to develop coded excitation for velocimetry in downhole drilling." 2015 IEEE International Conference on Computer and Information Technology; Ubiquitous Computing and Communications; Dependable, Autonomous and Secure Computing; Pervasive Intelligence and Computing. IEEE, 2015.) (Year: 2015).*

Korean Intellectual Property Office (ISR/KR), "International Search Report for PCT/US2021/048325", Korea, Dec. 23, 2021.

Friemel, B. H. et al., (1998). "Speckle decorrelation due to two-dimensional flow gradients," IEEE Transactions on Ultrasonics, Ferroelectrics, and Frequency Control, 45(2), pp. 317-327.

Gran, F. et al., (2008). "Coded Ultrasound for Blood Flow Estimation Using Subband Processing," IEEE Transactions on Ultrasonics, Ferroelectrics, and Frequency Control, 55(10), pp. 2211-2220.

Ruprecht, J. and Rupf, M. (1996). "On the Search for Good Aperiodic Binary Invertible Sequences," IEEE Transactions on Information Theory, 42(5), pp. 1604-1612.

Udesen, J. et al., (2008). "High Frame-Rate Blood Vector Velocity Imaging Using Plane Waves: Simulations and Preliminary Experiments," IEEE Transactions on Ultrasonics, Ferroelectrics, and Frequency Control, 55(8), pp. 1729-1743.

Wang, Y. et al., (2003). "Coded Excitation with Spectrum Inversion (CEXSI) for Ultrasound Array Imaging," IEEE Transactions on Ultrasonics, Ferroelectrics, and Frequency Control, 50(7), pp. 805-823.

Zhao, H. et al., (2007). "Barker-Coded Ultrasound Color Flow Imaging: Theoretical and Practical Design Considerations," IEEE Transactions on Ultrasonics, Ferroelectrics, and Frequency Control, 54(2), pp. 319-330.

Baranger, J. et al., (2018). "Adaptive Spatiotemporal SVD Clutter Filtering for Ultrafast Doppler Imaging Using Similarity of Spatial Singular Vectors," IEEE Trans. Med. Imaging, vol. 37, No. 7, pp. 1574-1586.

Misaridis, T. and Jensen, J. A., (2005). "Use of modulated excitation signals in medical ultrasound. Part I: Basic Concepts and Expected Benefits," IEEE Trans. Ultrason. Ferroelectr. Freq. Control, vol. 52, No. 2, pp. 177-191.

Kiranmai, B and Kumar P.R., (2015). "Performance Evaluation of Compound Barker Codes using Cascaded Mismatched Filter Technique," Int. J. Comput. Appl., vol. 121, No. 19, pp. 31-34.

Jensen, J. A., (1991). "A model for the propagation and scattering of ultrasound in tissue," J. Acoust. Soc. Am., vol. 89, No. 1, pp. 182-190.

Jensen, J. A. and Svendsen, N. B., (1992). "Calculation of pressure fields from arbitrarily shaped, apodized, and excited ultrasound transducers," IEEE Trans. Ultrason. Ferroelectr. Freq. Control, vol. 39, No. 2, pp. 262-267.

Chiao, Y. and Hao, X. (2005). IEEE Trans. Ultrason. Ferroelectr. Freq. Control, vol. 52, No. 2, pp. 160-170.

Daniels, R.C. and Gregers-Hansen, V. (2005). IEEE Natl. Radar Conf.—Proc., vol. 2005—Janua, No. January, pp. 256-261.

* cited by examiner

METHOD AND SYSTEM USING CODED EXCITATION WITH INVERTIBLE SKEW-SYMMETRIC BINARY SEQUENCES AND INVERSE FILTERING

CROSS-REFERENCE TO RELATED PATENT APPLICATION

This application claims priority to and the benefit of U.S. Provisional Patent Application Ser. No. 63/074,758, filed Sep. 4, 2020, which is incorporated herein by reference in its entirety.

STATEMENT AS TO RIGHTS UNDER FEDERALLY-SPONSORED RESEARCH

This invention was made with government support under Grant Nos. EB021937, EB020040, and HL156034, awarded by the National Institutes of Health, and Grant Nos. IIS1750994 and 1937963, awarded by the National Science Foundation. The government has certain rights in the invention.

FIELD OF THE INVENTION

The invention relates generally to signal processing, and more particularly to method and system using coded excitation with invertible skew-symmetric binary sequences and inverse filtering, and applications of the same.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

Sensitivity to slow blood flow is important for applications such as assessment of cancer therapy and measuring functional hyperemia due to muscle contraction or neural activation. However, thick abdominal walls or the presence of bone such as ribs or the skull cause significant attenuation and thereby reduce the signal-to-noise ratio (SNR). This in turn reduces sensitivity to slow moving blood flow and increases the minimum detectable velocity. One way to improve SNR is to inject microbubble contrast agents into the vascular system, but this increases the scan time, complexity, and invasiveness of the procedure, ultimately rendering it impractical for many applications.

Therefore, a heretofore unaddressed need exists in the art to address the aforementioned deficiencies and inadequacies.

SUMMARY OF THE INVENTION

One of the objectives of this invention is to provide method and system that utilize a coded excitation framework for increasing signal-to-noise ratio (SNR) and suppressing range lobe artifacts in ultrasound imaging or sensing, active sonar, light detection and ranging (LIDAR), and/or radar.

Among other things, embodiments of the invention demonstrate the feasibility and efficacy of the coded excitation framework for increasing the SNR of transcranial B-Mode imaging and transthoracic power Doppler imaging, which is of particular importance in challenging in vivo clinical imaging scenarios.

In one aspect of the invention, the method includes forming a coded excitation waveform with an encoding chip waveform and a binary sequence; transmitting the coded excitation waveform into a medium of interest, and receiving signals generated from the medium of interest responsive to excitation of the coded excitation waveform; and performing pulse compression on the received signals using a decoding filter to increase the SNR and suppress the range lobe artifacts.

In one embodiment, the encoding chip waveform is an application-dependent pulse that defines an axial/range resolution of a system and fits within a bandwidth of a transmitter of the system.

In one embodiment, the encoding chip waveform is modulated in either frequency, phase, amplitude, or a combination of them.

In one embodiment, the encoding chip waveform is a linear instantaneous frequency chirp signal.

In one embodiment, the binary sequence is an invertible skew-symmetric binary sequence or the Kronecker product of two or more such sequences.

In one embodiment, the invertible skew-symmetric binary sequence is an odd-length Barker code, or a Kronecker product of two or more odd-length Barker codes.

In one embodiment, said forming the coded excitation waveform comprises convolving the encoding chip waveform with an up-sampled binary sequence.

In one embodiment, the up-sampled binary sequence is generated by up-sampling the binary sequence by a factor that defines the spacing of the encoding chip waveforms in the coded excitation waveform.

In one embodiment, the up-sampling factor is greater than or equal to the length of the encoding chip waveform.

In one embodiment, the up-sampling factor is equal to the length of the encoding chip waveform.

In one embodiment, said performing the pulse compression comprises forming the decoding filter that serves as an inverse filter approximation for the binary sequence and a matched filter for the chip waveform.

In one embodiment, the decoding filter is a digital finite impulse response (FIR) filter.

In one embodiment, the decoding filter is an L-tap FIR pseudo-inverse filter.

In one embodiment, the decoding filter is formed using an inverse spectrum of the binary sequence approximated with a truncated Fourier series.

In one embodiment, the inverse filter approximation of the binary sequence is further up-sampled by a factor equal to or greater than the length of the encoding chip waveform that was used to form the coded excitation waveform.

In one embodiment, the decoding filter is further convolved with a decoding chip waveform.

In one embodiment, the decoding chip waveform used for the decoding filter is a measured impulse response of the transmitter and/or receiver.

In one embodiment, the decoding chip waveform is designed for a center frequency that is an integer multiple of the center frequency of the encoding chip waveform or the transmitted waveform.

In one embodiment, the decoding chip waveform is a measured impulse response of the receiver at the center frequency that is the integer multiple of the center frequency of the encoding chip waveform or the transmitted waveform.

In one embodiment, said forming the decoding filter comprises computing a discrete-time Fourier transform of the binary sequence to obtain a first spectrum; inverting the first spectrum and applying centering phase shifts on the inverted first spectrum based on a length of the binary sequence and a desired number of filter taps to obtain a second spectrum; performing an inverse discrete-time Fourier transform on the second spectrum to bring it back into the time domain to obtain a filter; and up-sampling the filter by a factor equal to or greater than the length of the encoding chip waveform used to construct the coded excitation waveform and optionally convolving the up-sampled filter with the decoding chip waveform to form the decoding filter.

In one embodiment, said computing the discrete-time Fourier transform of the binary sequence comprises computing an M-point discrete-time Fourier transform of the binary sequence, C(f), in the form of $$C(f) = \frac{1}{N}\sum_{n=0}^{N-1} c(n)e^{-2\pi j\left(\frac{f}{f_s}\right)n}, \frac{-f_s}{2} \le f < \frac{f_s}{2}$$

where c is the binary sequence, N is length of the binary sequence, f is a frequency that has M evenly spaced samples between $$-\frac{f_s}{2} \text{ and } \frac{f_s}{2},$$

$f_s$ is an axial sampling frequency; and multiplying the M×N Fourier matrix, $$e^{-2\pi j\left(\frac{f}{f_s}\right)n},$$

by the N×I binary sequence, c(n), via a matrix multiplication operation to obtain the first spectrum, C(f), that is an M×I spectrum.

In one embodiment, the second spectrum comprises $$D(f) = \frac{1}{C(f)} \frac{e^{-j\pi\left(\frac{f}{f_s}\right)(L-1)}}{e^{j\pi\left(\frac{f}{f_s}\right)N}}$$

where L is the desired number of filter taps and M≥L>N.

In one embodiment, said performing the inverse discrete-time Fourier transform on the second spectrum comprises computing the first L FIR filter coefficients, h(l), in the time domain by multiplying the second spectrum D(f) by an M×L Fourier matrix $$e^{2\pi j\left(\frac{lm}{M}\right)},$$

in the form of $$h(l) = \frac{1}{M}\sum_{m=0}^{M-1} D(f)e^{2\pi j\left(\frac{lm}{M}\right)},$$

-continued $$l \in [0, L-1],$$

$$m \in [0, M-1]$$

In one embodiment, the decoding filter comprises $$g(n) = \sum_{l=0}^{L-1} h(l)p(-n + lT_p f_s)$$

wherein $T_p f_s$ is the up-sampling factor which is the product of the encoding chip spacing in the coded excitation waveform, $T_p$, and the axial sampling frequency, $f_s$, and p is the decoding chip waveform.

In one embodiment, the decoding chip waveform is an impulse response of a transmitter and/or receiver.

In one embodiment, the decoding filter is constructed for real-valued or complex-valued data.

In one embodiment, the decoding filter is operably applied with a neural network.

In one embodiment, the method can be applied for ultrasound imaging or sensing, active sonar, LIDAR, and/or radar.

In another aspect of the invention, the system comprises a waveform generator configured to generate a coded excitation waveform with an encoding chip waveform and a binary sequence; a probe coupled to the waveform generator and configured to transmit the coded excitation waveform into a medium of interest, and to receive signals generated from the medium of interest responsive to excitation from the coded excitation waveform; and a signal processing unit coupled to the probe and configured to perform pulse compression on the received signals using a decoding filter to increase the SNR and suppress the range lobe artifacts.

In one embodiment, the coded excitation waveform is a convolution of the encoding chip waveform with an up-sampled binary sequence.

In one embodiment, the up-sampled binary sequence is generated by up-sampling the binary sequence by a factor that defines the spacing of the encoding chip waveforms in the coded excitation waveform.

In one embodiment, the up-sampling factor is greater than or equal to a length of the encoding chip waveform.

In one embodiment, the up-sampling factor is equal to the length of the encoding chip waveform.

In one embodiment, the encoding chip waveform is an application-dependent pulse that defines an axial/range resolution of the system and fits within a bandwidth of the probe.

In one embodiment, the encoding chip waveform is modulated in either frequency, phase, amplitude, or a combination of them.

In one embodiment, the encoding chip waveform is a linear instantaneous frequency chirp signal.

In one embodiment, the binary sequence is an invertible skew-symmetric binary sequence or the Kronecker product of two or more such sequences.

In one embodiment, the invertible skew-symmetric binary sequence is an odd-length Barker code, or a Kronecker product of two or more odd-length Barker codes.

In one embodiment, the probe comprises at least one transducer configured to transmit the coded excitation waveform into the medium of interest, and to receive signals generated from the medium of interest.

In one embodiment, the at least one transducer is operable in a pulse-echo sensing mode, and/or in a transmission sensing mode.

In one embodiment, the at least one transducer comprises one element or an array of elements.

In one embodiment, a phase or amplitude of the transmitted coded excitation pulse is either inverted or not inverted with respect to an immediately prior transmitted coded excitation pulse.

In one embodiment, the probe comprises one or more transmitters configured to transmit the coded excitation waveform into the medium of interest, and one or more receivers configured to receive signals generated from the medium of interest.

In one embodiment, the probe is operable in a pulse-echo sensing mode, and/or in a transmission sensing mode.

In one embodiment, the one or more receivers are configured to receive the echoed or backscattered signals of the transmit coded excitation waveform from the medium of interest.

In one embodiment, multiple transmitting/receiving events operably occur, each transmitting event utilizing one or more of the one or more transmitters, each receiving event utilizing some or all of the one or more receivers, and all or some received signals being combined for processing.

In one embodiment, the multiple transmitting/receiving events occur in which the phase or amplitude of the transmitted coded excitation pulse is either inverted or not inverted with respect to an immediately prior transmitted coded excitation pulse.

In one embodiment, the decoding filter is configured to serve as an inverse filter approximation for the binary sequence and a matched filter for the chip waveform.

In one embodiment, the decoding filter is a digital FIR filter.

In one embodiment, the decoding filter is an L-tap FIR pseudo-inverse filter.

In one embodiment, the decoding filter is formed using an inverse spectrum of the binary sequence approximated with a truncated Fourier series.

In one embodiment, the inverse filter approximation of the binary sequence is further up-sampled by a factor equal to or greater than the length of the encoding chip waveform.

In one embodiment, the decoding filter is further convolved with a decoding chip waveform.

In one embodiment, the decoding chip waveform is a measured impulse response of the probe.

In one embodiment, the decoding chip waveform is designed for a center frequency that is an integer multiple of the center frequency of the encoding chip waveform or the transmitted waveform.

In one embodiment, the decoding chip waveform is a measured impulse response of the receiver at the center frequency that is the integer multiple of the center frequency of the encoding chip waveform or the transmitted waveform.

In one embodiment, the system is an ultrasound imaging or sensing system, an active sonar system, a LIDAR system, and/or a radar system.

These and other aspects of the invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment.

In summary, even though the voltage excitation would only last for about 0.5 μs for this frequency, the transducer would ring for about 2 μs.

Figure 7:
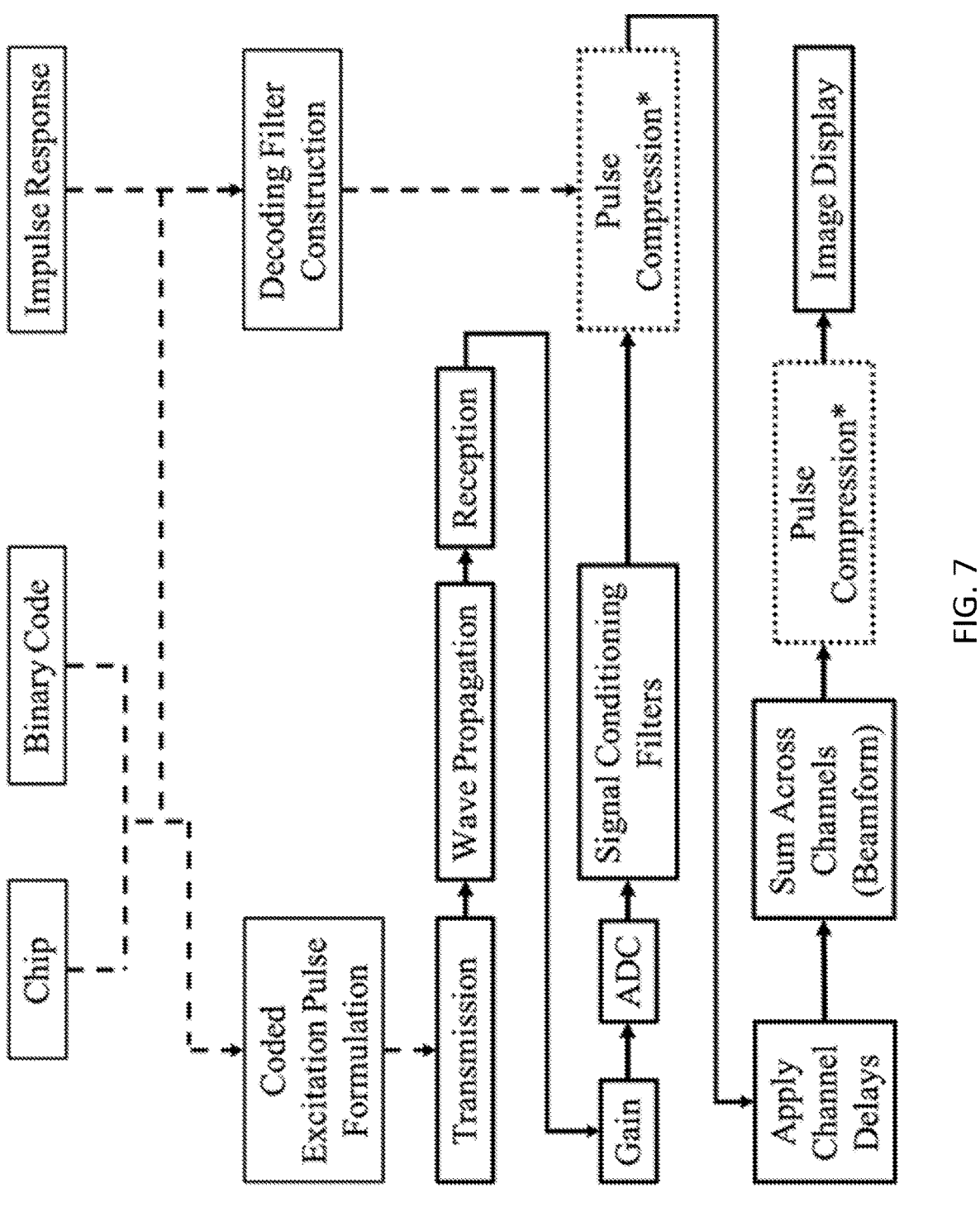

FIG. 7 shows a block diagram of a coded excitation framework according to embodiments of the invention. *Note that pulse compression is performed in one or the other location, not in both locations.

Figure 8:
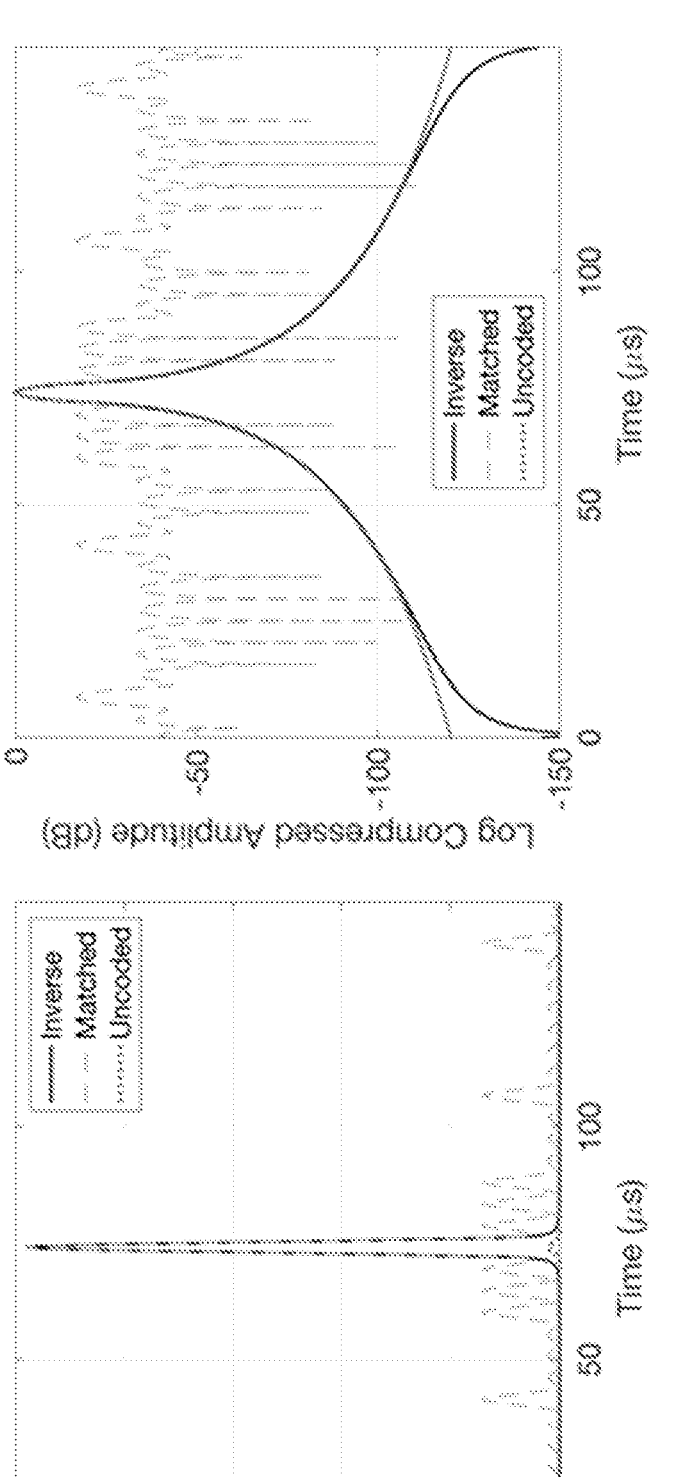

FIG. 8 shows coded excitation with a 7×7 compound Barker code according to embodiments of the invention. Left panel: Amplitude plots of a point target with the proposed decoding approach for pulse compression ("inverse"), matched filtering for pulse compression ("matched"), and an uncoded transmission ("uncoded") that used the chip waveform only. The two coded excitation approaches demonstrate a factor of 49 amplitude gain corresponding to the length of the code used. Matched filtering results in range lobes that are not present with inverse filtering. Right panel: The same amplitude plots as on the left but displayed on a log scale and with their maxima shifted to 0 dB. Pulse compression is able to recover axial resolution of the main lobe. Matched filtering again shows very high range lobes at $10 \log_{10}(7) = -8.45$ dB, whereas inverse filtering is able to suppress them completely.

Figure 9:
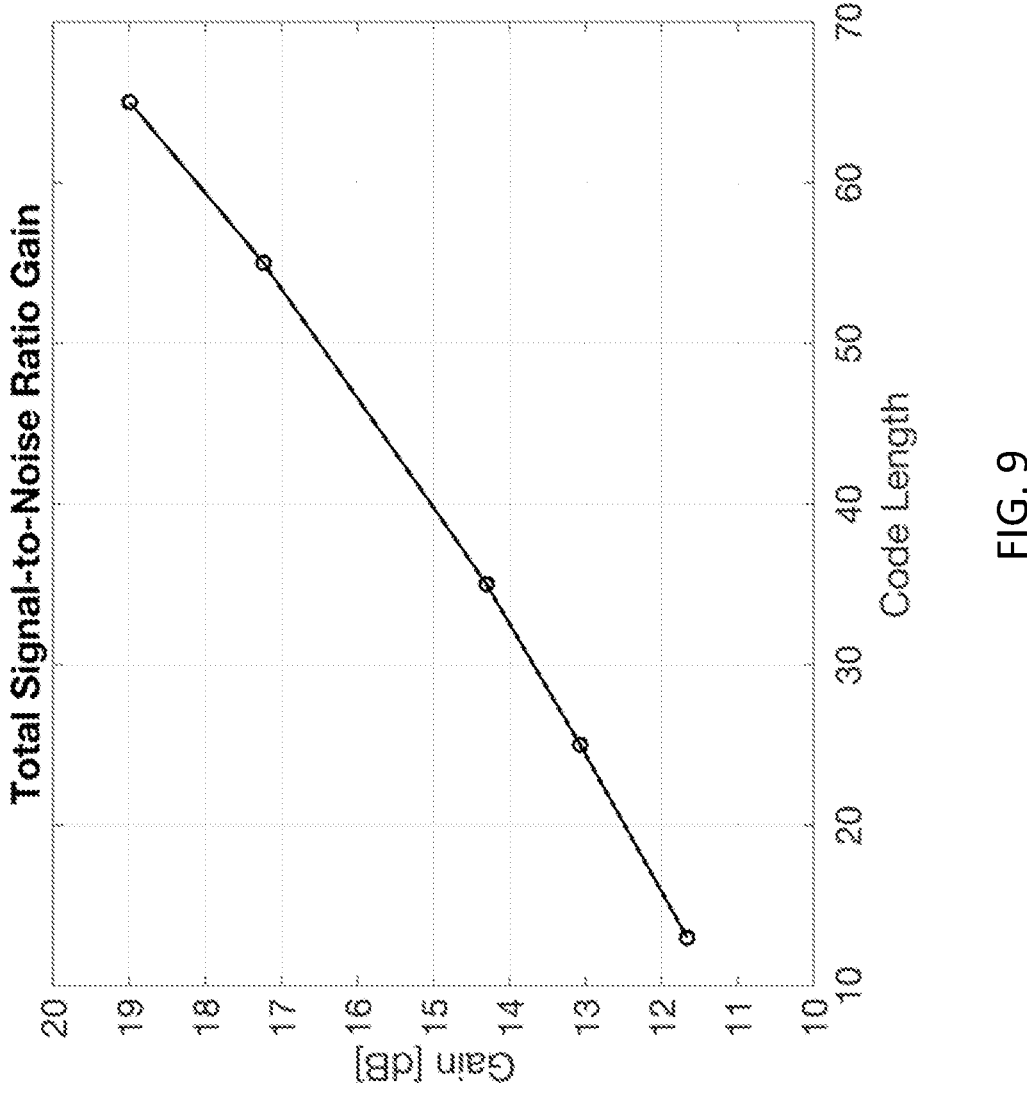

FIG. 9 shows a signal-to-noise ratio (SNR) gain as a function of code length in physical phantom imaging (CIRS, Norfolk, VA) with a P4-2v transducer (2.72 MHz) and a Verasonics Vantage 128 ultrasound scanner (Kirkland, WA).

SNR was calculated based on Equation (5), where $\rho$ is the normalized cross-correlation estimate computed across 100 frames with a 1000 Hz PRF. The SNR gain was calculated by subtracting the SNR of uncoded data from the SNR of the coded excitation data after pulse compression. The uncoded transmit was the single-cycle sine wave chip waveform. Note that, when comparing SNR in this fashion, the upper limit of the SNR gain is higher than $10 \log_{10}(\text{code length})$ due to the added gain of the matched filter that is incorporated in the decoding filter. However, in practice, this limit is rarely exceeded.

Figure 10:
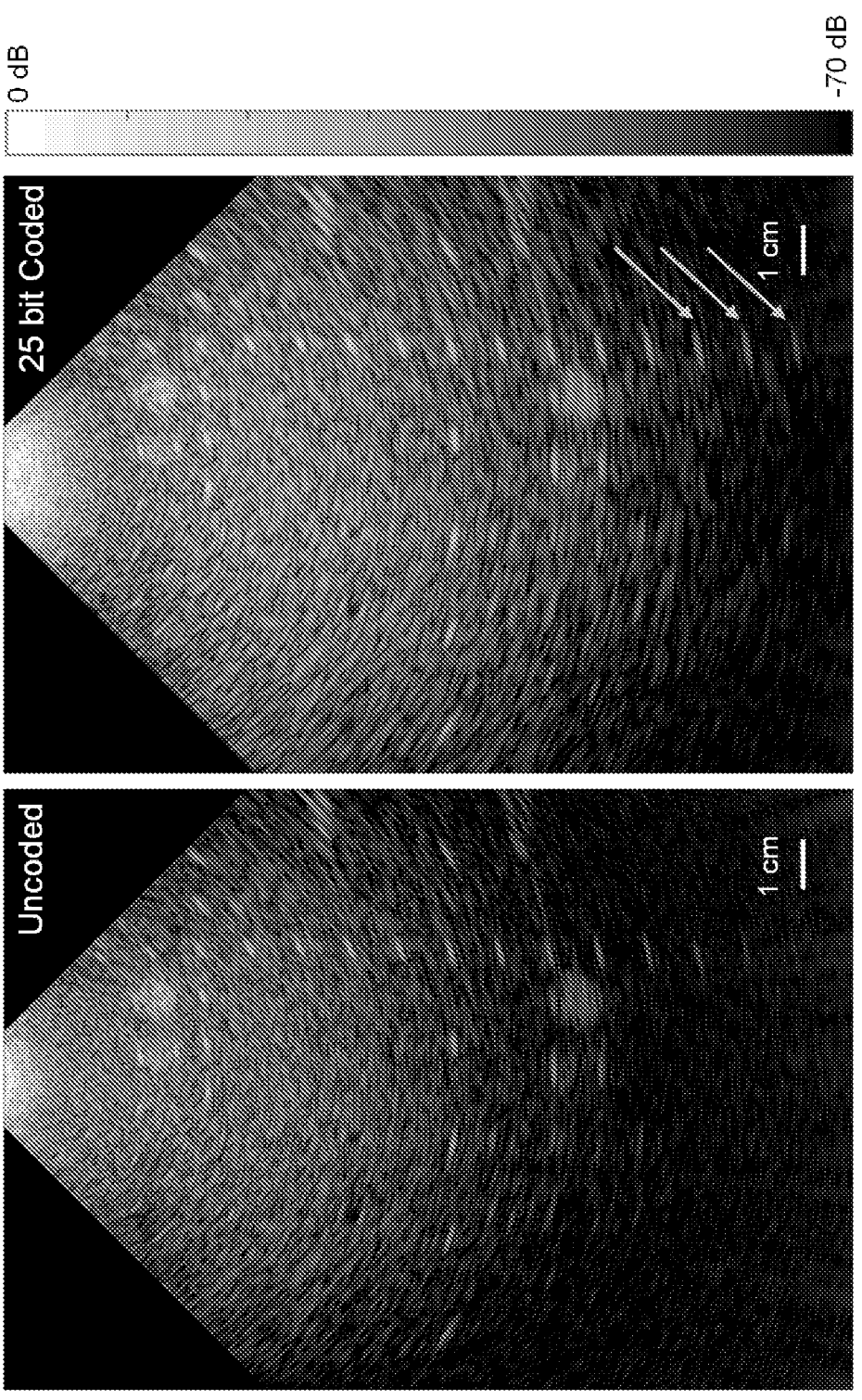

FIG. 10 shows a B-Mode images of a CIRS phantom (a 0.7 dB/cm/MHz) without and with 5×5 compound Barker coded excitation according to embodiments of the invention. Gold arrows indicate deep point targets that are poorly visualized without coded excitation.

Figure 11:
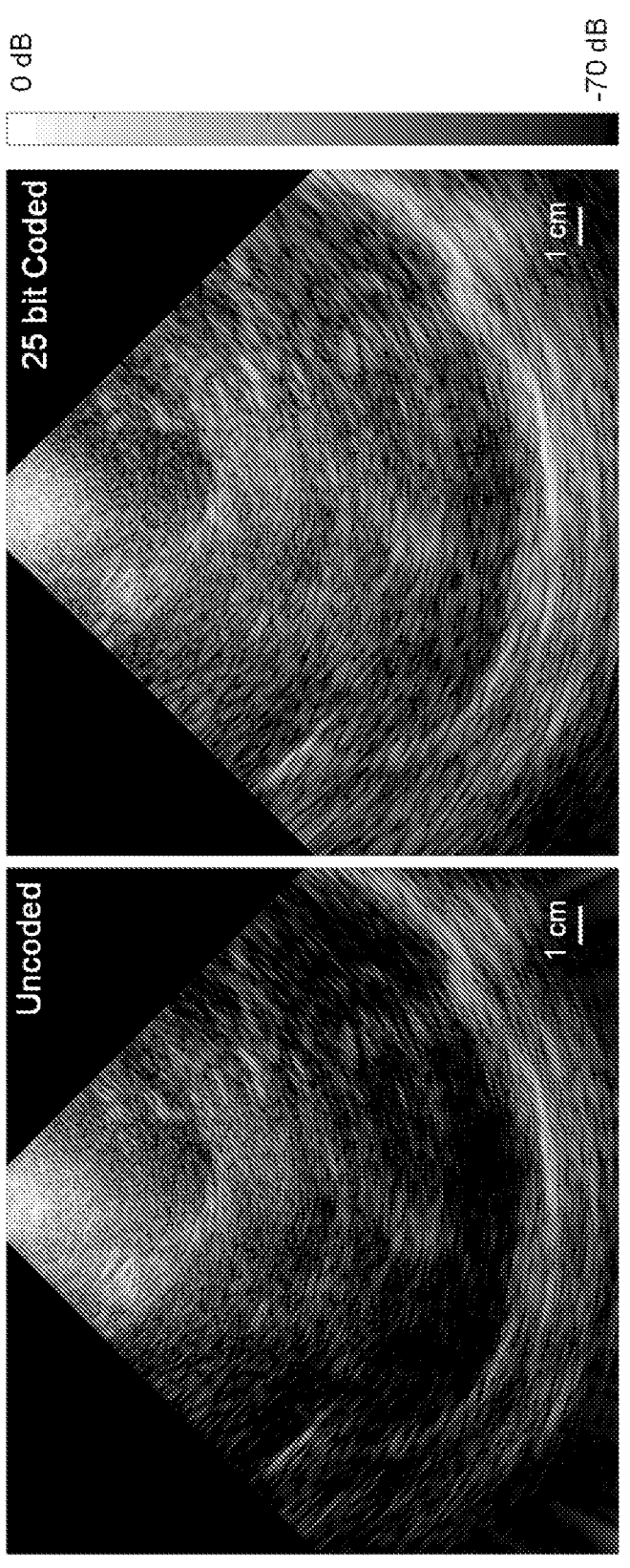

FIG. 11 shows B-Mode images of transcranial ultrasound on healthy adult male without and with 5×5 compound Barker coded excitation according to embodiments of the invention.

Figure 12:
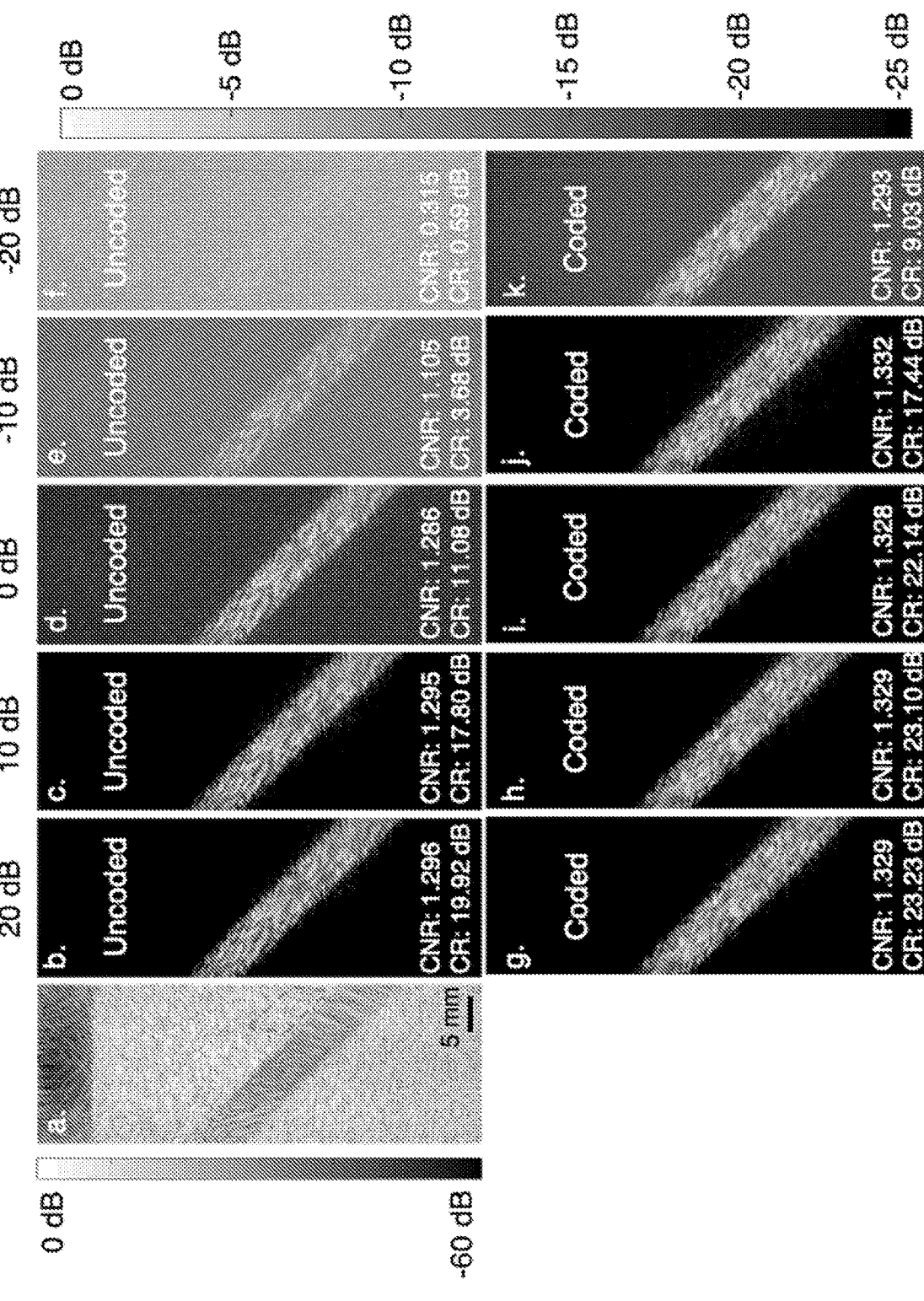

FIG. 12 shows Field II simulations according to embodiments of the invention. Panel a: B-Mode image of blood vessel with regions of interest (ROIs) used to calculate image quality metrics. All images shown on same spatial scale. Panels b-f: Power Doppler images with an uncoded transmit at 20, 10, 0, −10, and −20 dB blood-to-noise ratios. Panels g-k: Corresponding 25 bit coded excitation power Doppler images. All power Doppler images shown with same color map.

Figure 13:
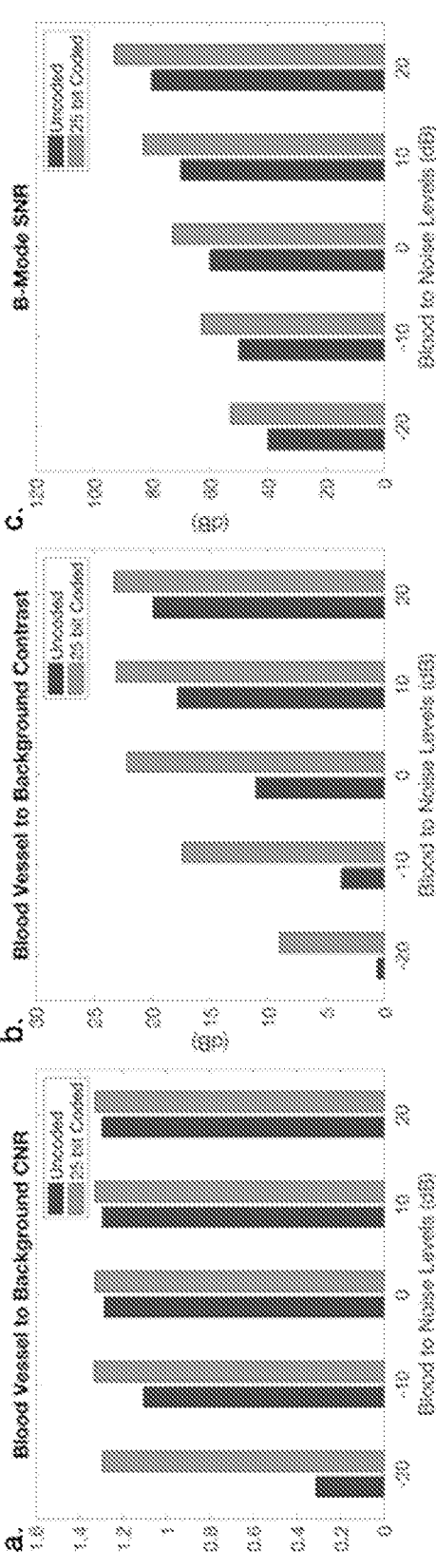

FIG. 13 shows bar graphs comparing image quality metrics between coded and uncoded excitation approaches corresponding to FIG. 12 according to embodiments of the invention. Panel a: Contrast-to-noise ratio between the blood vessel and the background calculated on the clutter filtered power Doppler image according to Equation (6). Panel b: Contrast ratio between the blood vessel and the background calculated on the clutter filtered power Doppler image according to Equation (7). Panel c: SNR calculated on the enveloped data before clutter filtering according to Equation (5).

Figure 14:
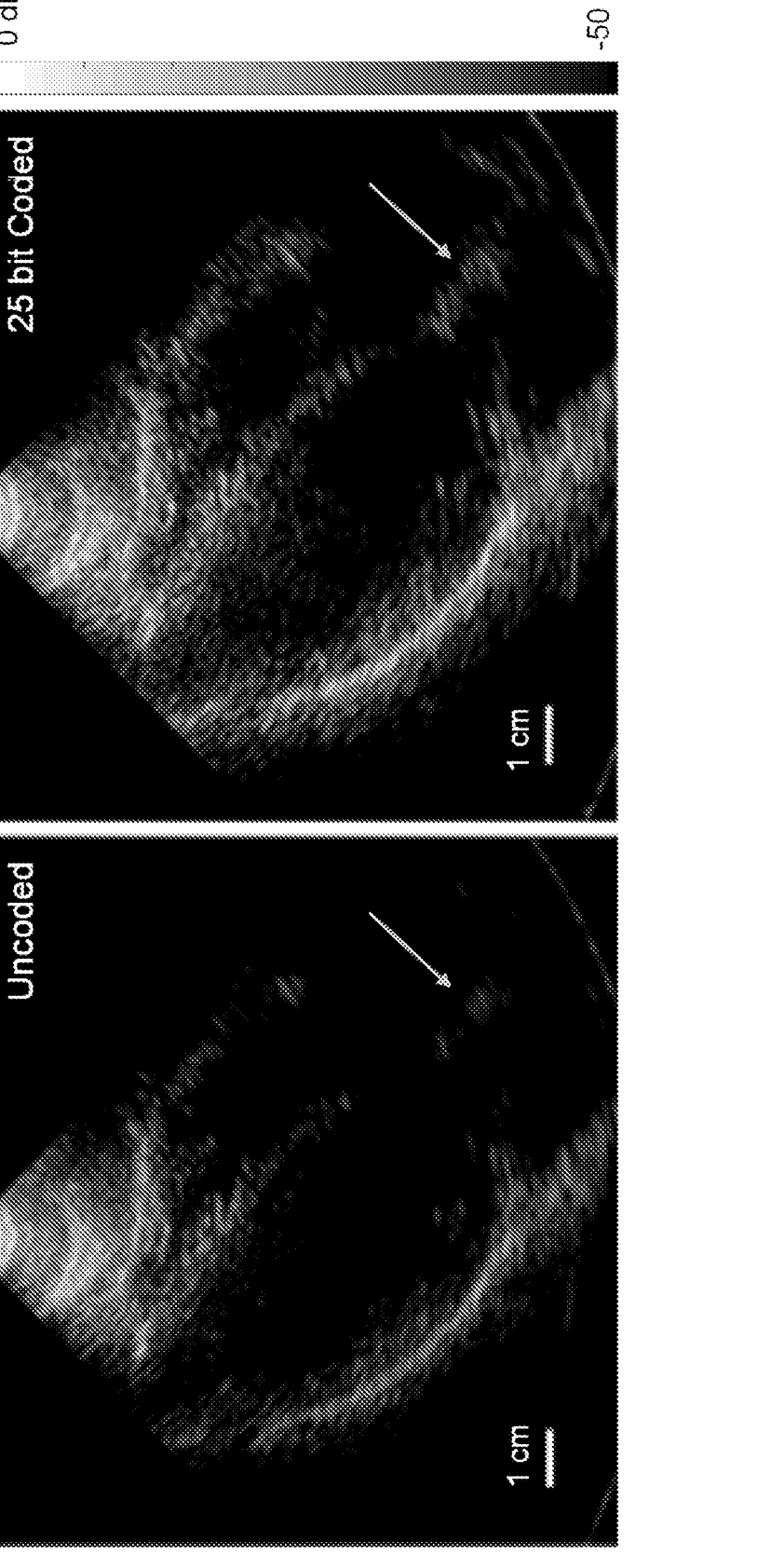

FIG. 14 shows qualitative comparison of uncoded and 5×5 compound Barker coded excitation approaches in transthoracic cardiac imaging of a healthy adult male subject according to embodiments of the invention. Gold arrow indicates walls of the heart that become more clearly visualized with coded excitation.

Figure 15:
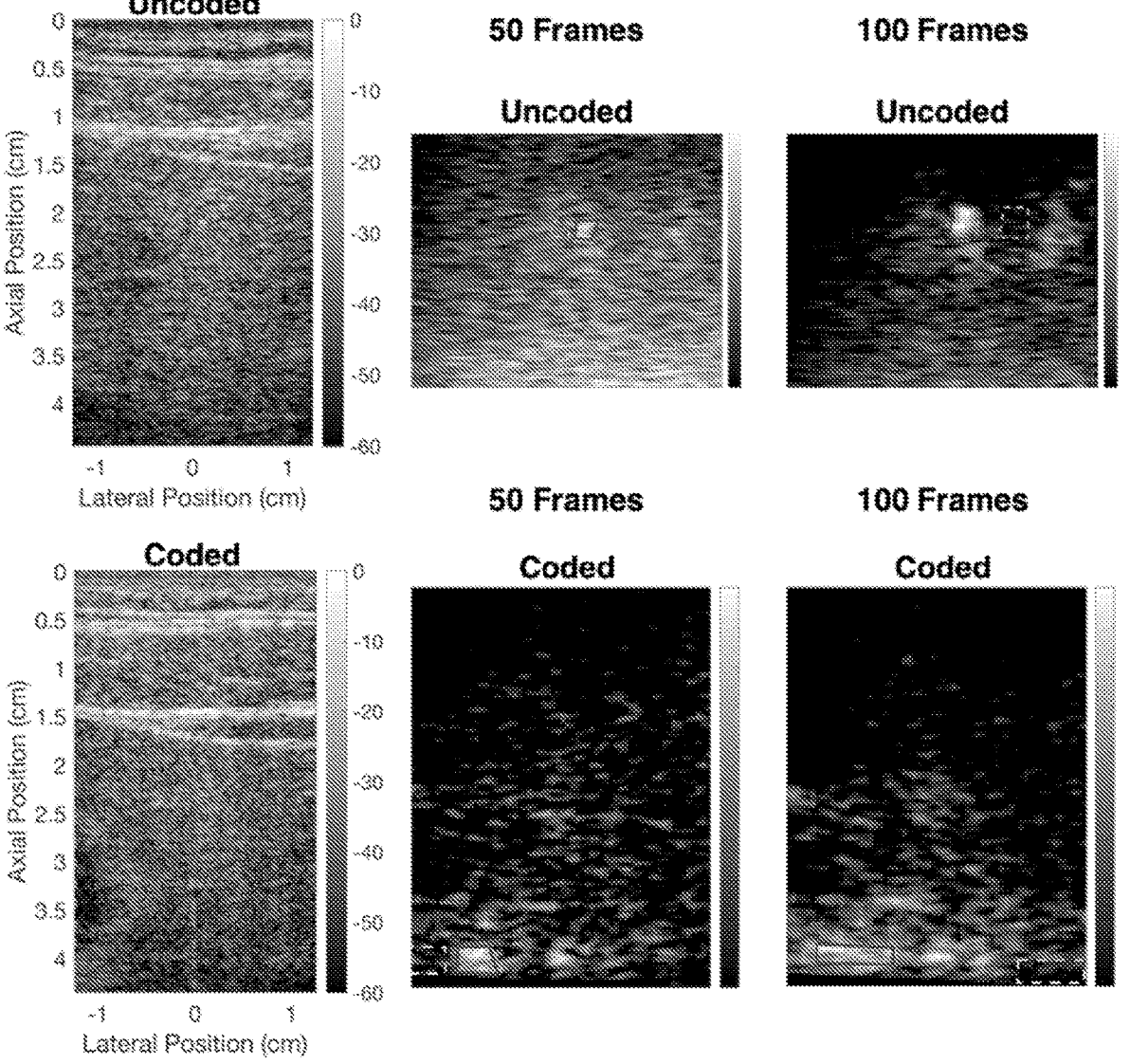

FIG. 15 shows in vivo liver imaging results in a healthy adult subject according to embodiments of the invention. Gray scale images depict the focused B-Mode images used for targeting. The red dashed boxes indicate the region of the plane wave synthetic aperture (PWSA) data that was processed to form power Doppler images, shown in color. In the power Doppler images, green dashed boxes indicate background ROIs and blue solid boxes indicate blood vessel ROIs used for calculating CNR and contrast according to Equations 1 and 2. Power Doppler color bar range is 10 dB in all cases.

DETAILED DESCRIPTION OF THE INVENTION

The invention will now be described more fully hereinafter with reference to the accompanying drawings, in which exemplary embodiments of the invention are shown. The invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the invention.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" to another feature may have portions that overlap or underlie the adjacent feature.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation shown in the figures. For example, if the device in one of the figures is turned over, elements described as being on the "lower" side of other elements would then be oriented on the "upper" sides of the other elements. The exemplary term "lower" can, therefore, encompass both an orientation of lower and upper, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around," "about," "substantially" or "approximately" shall generally mean within 20 percent, preferably within 10 percent, and more preferably within 5 percent of a given value or range. Numerical quantities given herein are approximate, meaning that the terms "around," "about," "substantially" or "approximately" can be inferred if not expressly stated.

As used herein, the terms "comprise" or "comprising," "include" or "including," "carry" or "carrying," "has/have" or "having," "contain" or "containing," "involve" or "involving" and the like are to be understood to be open-ended, i.e., to mean including but not limited to.

As used herein, the phrase "at least one of A, B, and C" should be construed to mean a logical (A or B or C), using a non-exclusive logical OR. As used herein, the term "and/or" includes any and all combinations of one or more of the associated listed items.

Embodiments of the invention are illustrated in detail hereinafter with reference to accompanying drawings. The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

In certain aspects, this invention relates to a coded excitation framework with binary invertible skew-symmetric sequences and inverse filtering, which includes a coded excitation scheme and a pulse compression scheme for the use of pulse-echo measurements such as in ultrasound, radar, or sonar technology for the purpose of increasing the signal-to-noise ratio (SNR).

In some embodiments, the coded excitation scheme makes use of compound Barker codes, which are Barker codes combined via the Kronecker product. A Barker code is a binary (+1/−1 or 0°/−180°) sequence of bits that has ideal autocorrelation properties such that the range lobes have normalized magnitudes of 1/N, where N is the code length. Barker codes greater than length 2 also have the property that their Fourier transforms have no zeros. There are only 9 unique Barker codes (excluding reversals and negations) currently known. The longest one is 13 bits long, leading to range lobes at −22.28 dB if pulse compression is performed via matched filtering. As an example, a compound Barker code could be created from a 3 bit Barker code [+1 +1 −1] and a 5 bit Barker Code [+1 +1 +1 −1 +1] by computing their Kronecker product, resulting in [+1 +1 −1 +1 +1 −1 +1 +1 −1 −1 −1 +1 +1 +1 −1]. While these compound Barker codes do not have the ideal autocorrelation property that their range lobes do not exceed 1/N, they do have the property that they have no zeros in the Fourier domain (as long as they are not derived from the 2 bit Barker code). The significance of this fact will be addressed below. The Kronecker product can be used to compound an arbitrary number of Barker codes, suggesting that binary codes of arbitrary length can be created. This is valuable because the SNR gain that can be achieved with Barker coded excitation is on the order of $10 \log_{10}(N)$, implying that longer code lengths yield larger gains in SNR. In order to create the final coded excitation pulse for transmission, the compound Barker code is up-sampled and then convolved with the encoding chip waveform, where the encoding chip is simply a short, application-dependent pulse such as a single cycle sine wave. The pulse width of the encoding chip waveform defines the axial/range resolution. The compound Barker code is thus applying phase shifts of 0°/−180° to the encoding chip waveform.

In some embodiments, the pulse compression scheme is applied to the pulse-echo signal received after transmission of the compound Barker coded waveform. Pulse compression is performed to recover the axial resolution and achieve signal amplification. Traditionally, pulse compression is performed via a matched filter. For compound Barker codes, this results in the presence of range lobes that are as high as 1/N', where N' is the length of the shortest Barker code used to construct the compound Barker code. In terms of peak to range lobe level contrast, this is no better than simply using a normal Barker code. However, since compound Barker codes have no zeros in the Fourier domain, a very stable inverse filter can be constructed and applied to the received signal in place of matched filtering. That is the approach taken in this invention. In theory, the inverse filter can reduce range lobes to lower than −100 dB, effectively rendering them inconsequential. This is ideal for applications such as diagnostic ultrasound in which high dynamic range is important.

Figure 1:
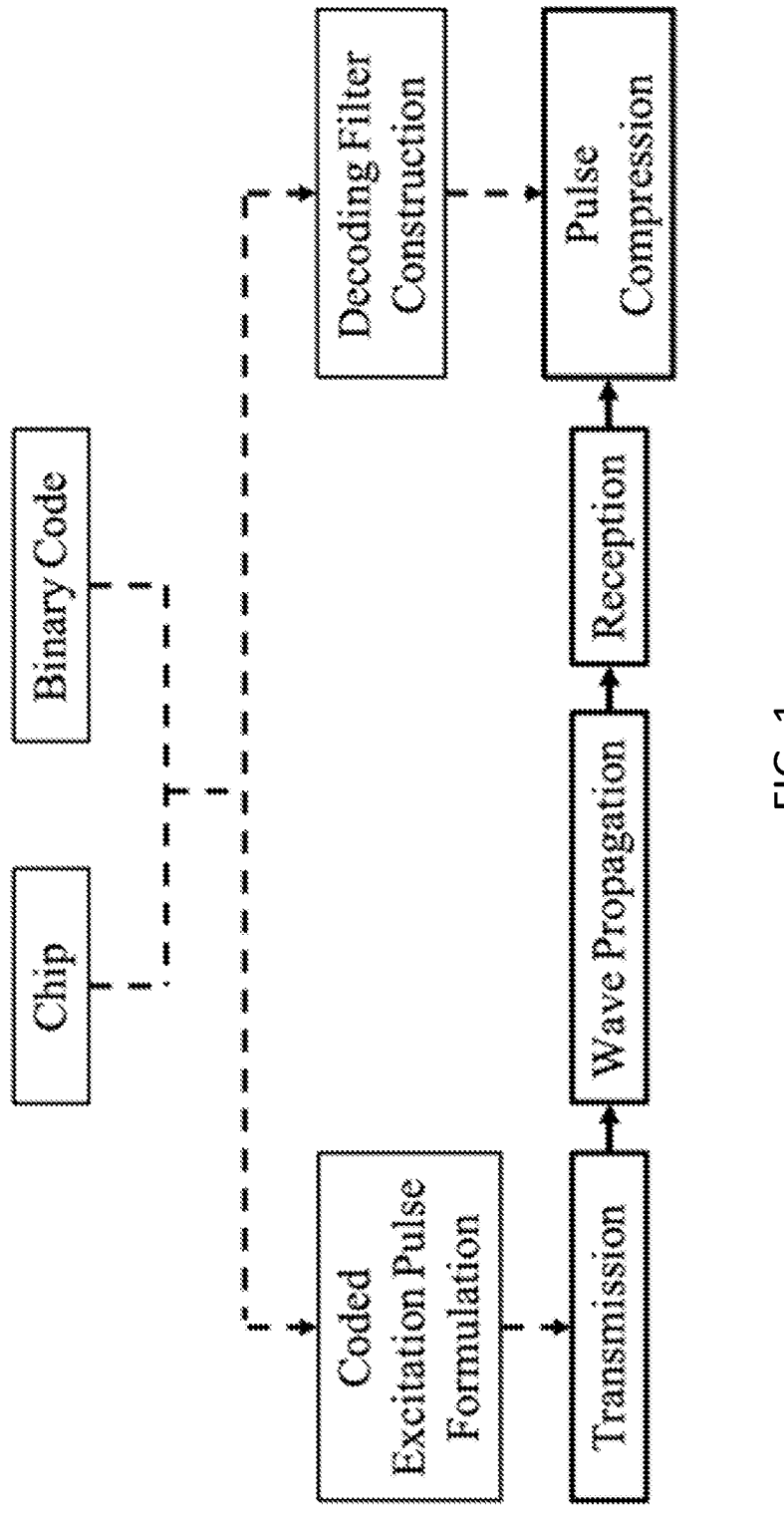
FIG. 1 shows a block diagram of a coded excitation framework, according to embodiments of the invention.

Referring to FIG. 1, a block diagram of the coded excitation framework is shown according to embodiments of the invention. This coded excitation framework will mostly be discussed herein according to one exemplary embodiment, i.e., medical ultrasound imaging. It should be noted that other embodiments could be envisaged as well.

Coded excitation refers to the process of modulating an excitation waveform, transmitting and subsequently receiving said waveform, and performing pulse compression to demodulate the received data. One of the purposes of the coded excitation is to increase the SNR. This is especially helpful in scenarios with high attenuation, high amounts of noise, or low signal amplitude. Since attenuation increases with propagation distance of a wave, the coded excitation can also be thought of as a way to increase the effective penetration depth or distance a wave can travel before becoming too attenuated. The two critical aspects of the coded excitation framework are (i) formation of the coded excitation pulse and (ii) construction of the decoding filter for pulse compression, as shown in FIG. 1.

Formation of the Coded Excitation Pulse

The coded excitation pulse is formed by convolving a waveform (referred to in the literature as a 'chip' waveform, also called an "encoding chip waveform" in the disclosure) with an up-sampled binary sequence of +1's and −1's which represent 0 and 180 degree phase shifts, respectively.

Figure 2:
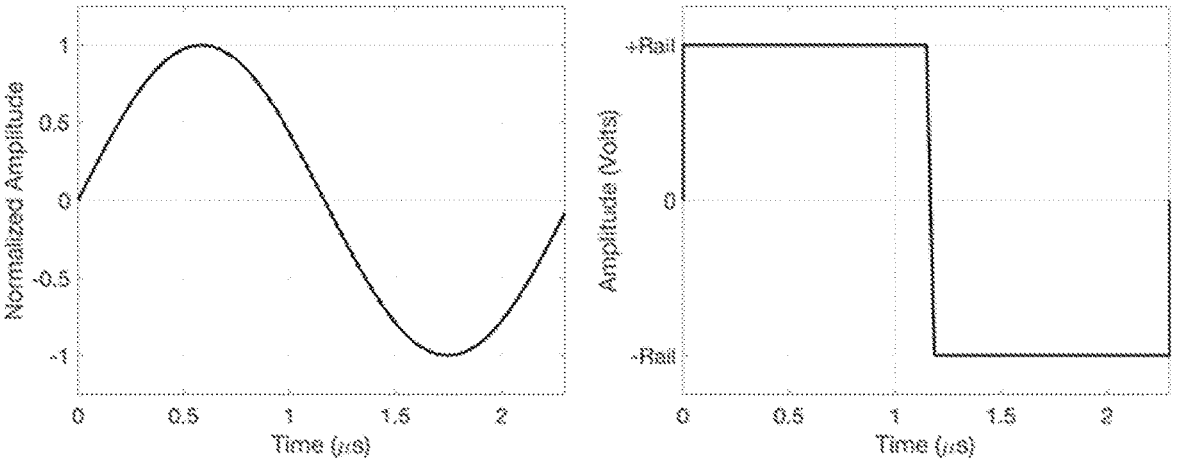
FIG. 2 shows an exemplary encoding chip waveform. Left panel: A single-cycle sinusoid at 2.72 MHz, the center frequency of the P4-2v ultrasound transducer. This is an example of an encoding chip waveform. Right panel: The voltage signal corresponding to the encoding chip waveform on the left. With a tri-state pulser, only three voltage states are possible: +Rail, 0, or −Rail.

Encoding Chip Waveform: The chip waveform (i.e., encoding chip waveform) is an application-dependent pulse that defines the axial/range resolution of the system and fits within the bandwidth of the transmitter (i.e., the ultrasound transducer). The axial dimension, also called the range dimension, is the direction of acoustic propagation and is perpendicular to the surface of the transducer. For applications such as ultrasound imaging, radar, active sonar, and LIDAR, the encoding chip pulse is necessary to ensure the transmitted waveform fits within the bandwidth of the transducer (or laser). This is important because if the binary code were transmitted directly, most of the energy content would be outside the passband of the transducer which would be highly inefficient and would result in heating of the transducer. However, for applications such as communications where the goal is to simply transmit bits of information, the encoding chip pulse is unnecessary. An example of a single-cycle sine wave at a center frequency of 2.72 MHz of the P4-2v ultrasound transducer is shown in FIG. 2 (left panel).

In one embodiment, a Verasonics Vantage 128 ultrasound scanner (Kirkland, WA) is used due to the flexibility it provides in generating custom pulse sequences. This scanner (like many others) has a tri-state pulser, meaning that it can only produce voltage signals at positive rail voltage, zero voltage, and minus rail voltage. The piezoelectric elements of the ultrasound probe transduce these voltage signals into ultrasound pressure waves that are transmitted into the imaging medium. An example of a tri-state voltage signal corresponding to the encoding chip pulse shown in FIG. 2 (left panel) is provided in FIG. 2 (right panel). This encoding chip waveform is sampled at the clock rate of the ultrasound scanner, which in this case is 250 MHz. With a tri-state pulser, only three voltage states are possible: +Rail, 0, or −Rail.

Selection of the Binary Sequence: The selection of the binary sequence used to perform phase modulation of the encoding chip pulse is of the utmost importance. In order to use an inverse filtering approach, the binary sequence must be invertible, meaning that there are no zeros/nulls in the Fourier domain (Gran 2008, Udesen 2008, Wang 2003). This can be easily verified by computing the Fourier transform of a binary code using the fast Fourier transform routine and displaying the magnitude of the result, i.e., $|\mathcal{F}(c)|$, where $\mathcal{F}()$ represents the Fourier transform and c represents the binary code. Note that the code must be zero-padded first in order to produce an adequately sampled spectrum. It can be verified that all Barker codes longer than 2 bits have full spectral support and are invertible i.e., their spectrums do not cross zero at any point. Other invertible binary sequences have been discovered as well (Ruprecht 1996).

Another crucial requirement of the invertible binary code is that it is skew-symmetric, i.e., it is of odd length and obeys the following relation:

$$c(N'-l)=(-1)^l c(N'+l), 0 \le l \le N', 2N'+1=N=\text{total length of sequence.}$$

All of the odd-length Barker codes are skew-symmetric. In addition, there are other invertible binary codes that have been discovered that are also skew-symmetric (Ruprecht 1996, Zhao 2007). Skew-symmetry is required due to the manner in which the decoding filter is constructed. In particular, it is because of the use of the encoding chip waveform that the binary code must be skew-symmetric. Without the encoding chip waveform, this no longer is a requirement.

The selection of the invertible binary code is important for two reasons: (1) The longer the code, the greater the SNR gain. The theoretical, ideal SNR gain is $10 \log_{10}(\text{code length})$. However, with an inverse filter approach, this gain will not quite be realized in practice due to the enhancement of noise that is inherent in the inverse filtering approach. (2) Due to their spectral properties, the spectral ripples of some binary invertible sequences can be more perfectly equalized by an inverse filter than others. Said differently, an inverse filter will enhance noise to some degree, but some sequences have lower noise enhancement factors than others and as such will yield a smaller loss in SNR gain (Ruprecht 1996).

In addition, since SNR gain depends on the code length, it is desirable to create long binary codes that are invertible, skew-symmetric, and have low noise enhancement factors. It has been shown that computing the Kronecker product of two or more such sequences produces a binary sequence that is also invertible and skew-symmetric with a noise enhancement factor that can be approximated by the sum of the noise enhancement factors of the constituent sequences (Ruprecht 1996). The Kronecker product is defined by:

$$a \otimes b = (a_1 b, a_2 b, a_3 b, \ldots a_N b)$$

If sequence $a=[a_1, a_2, \ldots a_N a]$ is of length Na and sequence $b=[b_1, b_2, \ldots b_{Nb}]$ is of length $N_b$, the resulting sequence will be of length $N_a \times N_b$. For example, a compound code can be generated with a 3 bit Barker code as: [1 1 −1] 0 [1 1 −1]=[1 1 −1 1 1 −1 −1 −1 1]. Since the 3 bit Barker code is invertible, the compound code including two 3 bit Barker codes is also invertible. Furthermore, this compound code is also skew-symmetric.

There are other trade-offs at play in the selection of the binary code as well. The ability to perform perfect pulse compression depends somewhat on the linearity of the ultrasound system, i.e., the ability of the system to maintain the amplitude and phase characteristics of the desired excitation pulse throughout the entire duration of the pulse. Examples of nonlinearity would include voltage droop or phase drift which can occur when a pulser is overloaded. These types of nonlinearities tend to accrue with longer excitation pulses and therefore could place an upper limit on the maximum length of the binary sequence used. This of course will be system- and application-dependent. Another limitation that may place upper bounds on the maximum length of the binary sequence would be the desired start depth for imaging. Since the transducer must finish transmitting the pulse before it can begin receiving the backscattered echoes, the start depth is limited by the spatial pulse length of the excitation signal. Note that this only applies when the same transducer is used for transmit and receive as is typically (but not always) the case in medical ultrasound imaging.

Figure 3:
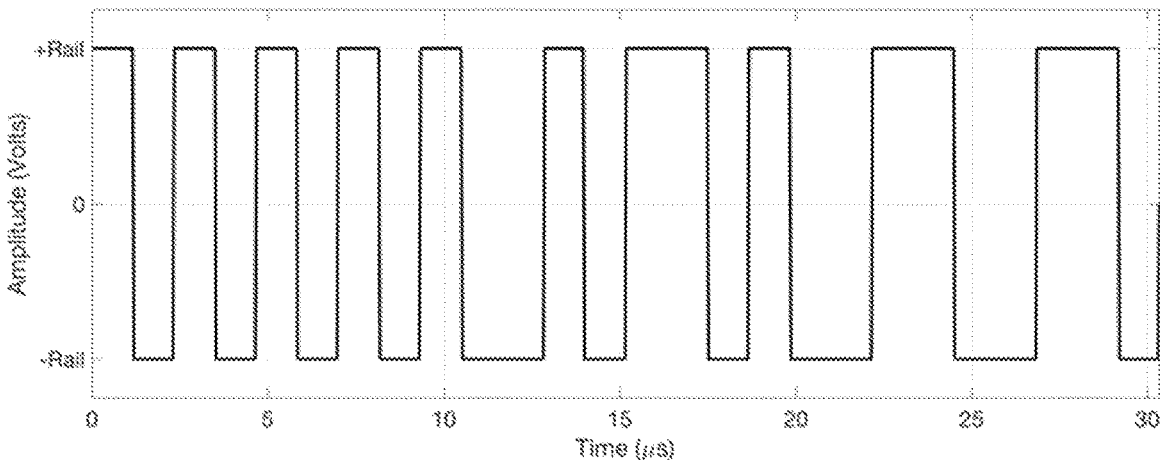
FIG. 3 shows a coded excitation waveform voltage signal that is used to excite the transducer, according to embodiments of the invention. This is the convolution of the up-sampled 13 bit Barker code and the tri-state voltage representation of the encoding chip waveform from FIG. 2. The Barker code was up-sampled by a factor $T_p$ equal to the length of the encoding chip.

Convolution of the Encoding Chip and the Binary Sequence: The last step in the creation of the coded excitation waveform is to convolve the encoding chip waveform with the selected binary sequence. However, before convolution, the binary sequence must be up-sampled by a factor of $T_p f_s$ which defines the spacing of the chip waveforms in the coded excitation pulse. This coded excitation signal is given by $$x(n) = \sum_{l=0}^{N-1} c(l)p(n - l \cdot T_p f_s)$$

where N is the length of the binary code c, p is the encoding chip waveform, $T_p$ is the chip spacing, and $f_s$ is the axial sampling frequency. $T_p$ must therefore be greater than or equal to the length of the encoding chip waveform. In fact, best results are obtained when $T_p$ is exactly equal to the encoding chip length. An example of the convolution between an up-sampled 13 bit Barker code and a tri-state voltage representation of the encoding chip waveform is shown in FIG. 3. The coded excitation waveform voltage signal that is used to excite the transducer, which is the convolution of the up-sampled 13 bit Barker code and the tri-state voltage representation of the encoding chip waveform from FIG. 2. The Barker code was up-sampled by a factor $T_p f_s$ equal to the length of the encoding chip. In particular, note that throughout the duration of the pulse, there are no instances of zero voltage, only positive or negative rail. Also note that there are no equalization pulses added to the beginning or the end of the pulse. This is of particular importance for the present embodiment which utilizes the Verasonics scanner.

Figure 4:
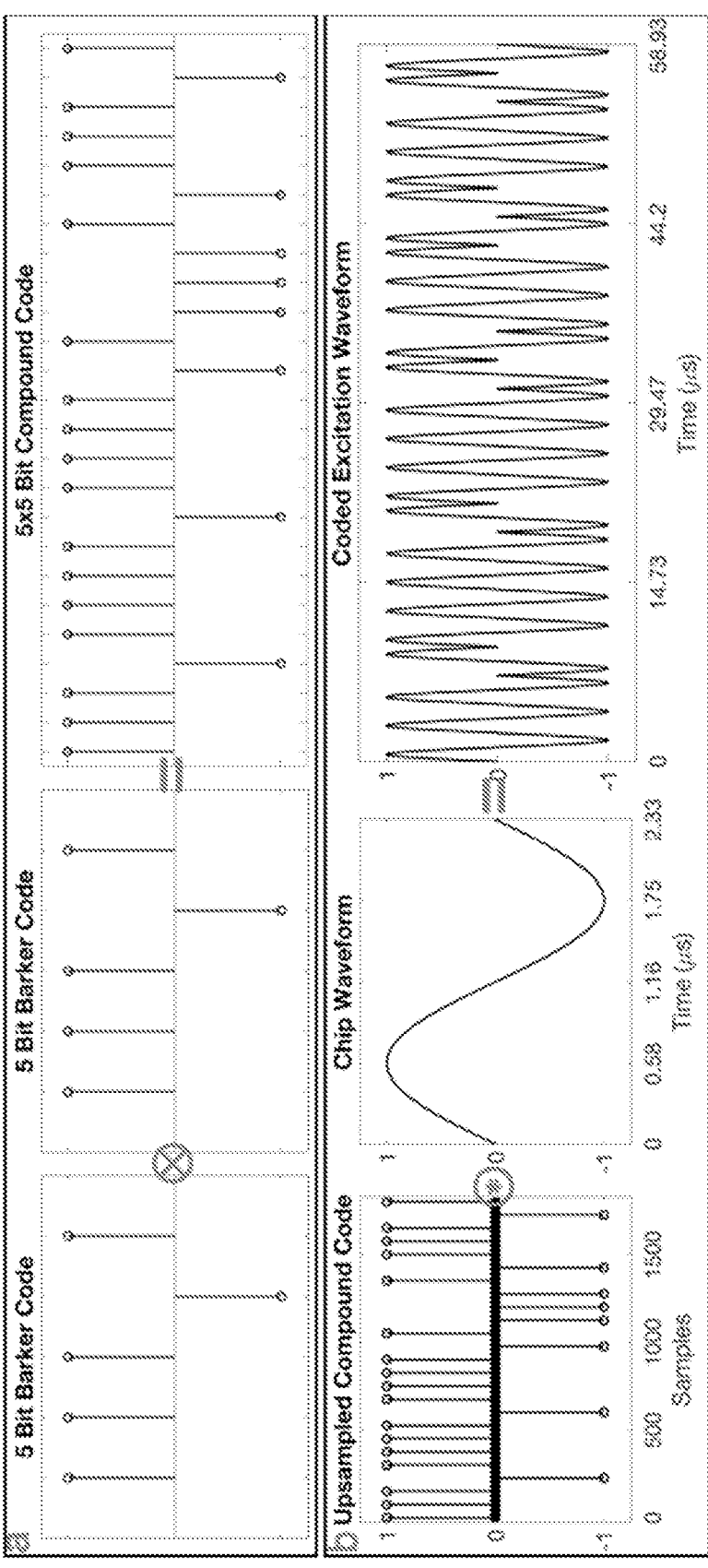
FIG. 4 shows the principles of coded excitation and pulse compression via inverse filtering, according to embodiments of the invention. Specifically, convolution of 5×5 compound Barker code with a single cycle sine wave produces coded excitation pulse shown in Panel a. Fourier transform of the 5×5 compound Barker code has no zeros, allowing for construction of an inverse fitter shown in Panel b. Inverse filtering compresses the pulse, produces no range lobes, and recovers axial resolution shown in Panel c.

FIG. 4 shows the principles of coded excitation and pulse compression via inverse filtering, according to embodiments of the invention. Specifically, convolution of 5×5 compound Barker code with a single cycle sine wave produces coded excitation pulse as shown in Panel a. Fourier transform of the 5×5 compound Barker code has no zeros, allowing for construction of an inverse fitter as shown in Panel b. Inverse filtering compresses the pulse, produces no range lobes, and recovers axial resolution as shown in Panel c.

Transmitting and Receiving the Data

After forming the coded excitation waveform, it is transmitted by the transducer into the medium. In pulse-echo sensing modes such as in medical ultrasound applications, the sound waves travel into the medium where they reflect off of scatterers and travel back towards the same transducer for reception. Note that in other embodiments, a different transducer may be used for reception versus transmission and multiple transducer devices may be used simultaneously for transmission and/or reception. Other possible embodiments include a transmission mode (as opposed to a pulse-echo mode) in which the sound waves that pass through a medium are sensed as opposed to sound waves that are backscattered. Finally, other embodiments involving mechanical waves in general (i.e., at frequencies other than ultrasonic frequencies and in propagation modes other than compressional) as well as electromagnetic waves could be envisaged.

In one embodiment, the incident pressure waves transduced to voltage signals by the piezoelectric elements of the transducer during reception of the backscattered ultrasonic waves. These voltage signals are amplified and then sampled by a 12 bit ADC. The digital signals are then filtered via anti-aliasing and other signal conditioning filters (FIG. 7) before being transferred to the host computer for further processing and/or saving. The data at this stage is considered the 'raw' channel data.

Formation of the Decoding Filter

Mathematical Formulation: The decoding filter used for pulse compression can be described as an L-tap FIR (finite impulse response) pseudo-inverse filter, where the term 'pseudo' refers to the fact that the filter approximates the inverse spectrum of the code with a truncated Fourier series. In other words, the first L samples of the inverse discrete Fourier transform of the binary code are used to construct the decoding filter. The steps are summarized as follows:

1) Computing the M-point discrete-time Fourier transform of the binary code;
2) Inverting the spectrum and taking into account phase shifts based on code length and number of desired filter taps;
3) Taking the inverse discrete-time Fourier transform to bring it back into the time domain; and
4) Up-sampling and convolving the filter with a chip pulse (i.e., a decoding chip waveform).

A more detailed explanation of the above steps follows.

The first step to creating the decoding filter is to compute the discrete-time Fourier transform of the binary code. In some embodiments, the binary code is a compound Barker code. Note that this is not performed on the up-sampled binary code nor is it performed on the coded excitation pulse (i.e., the encoding chip convolved with the up-sampled code). Using a Fourier matrix, the M-point Fourier transform of a binary code c with length N is given by $$C(f) = \frac{1}{N}\sum_{n=0}^{N-1} c(n)e^{-2\pi j\left(\frac{f}{f_s}\right)n},$$ (1)

$$\frac{-f_s}{2} \le f < \frac{f_s}{2}$$

where the frequency f has M evenly spaced samples between $$-\frac{f_s}{2} \text{ and } \frac{f_s}{2}$$

and $f_s$ is the axial sampling frequency, e.g., 250 MHz in one embodiment. To evaluate Equation (1), the M×N Fourier matrix, $$e^{-2\pi j\left(\frac{f}{f_s}\right)n},$$

is formed and subsequently multiplied by the N×1 binary code, c(n), via a matrix multiplication operation, resulting in an M×I spectrum, C(f).

The resulting spectrum is then inverted and centering phase shifts are applied as follows in Equation (2), where L is the desired number of filter taps and f is defined as above. Note that M≥L>N. Historically, L is often a power of 2, although this is not strictly necessary. Also note that the larger N is, the larger L needs to be for adequate compression and reduction of range lobes.

$$D(f) = \frac{1}{C(f)} \frac{e^{-j\pi\left(\frac{f}{f_s}\right)(L-1)}}{e^{j\pi\left(\frac{f}{f_s}\right)N}} \quad (2)$$

To compute the first L FIR filter coefficients, h(l), in the time domain, D(f) in Equation (2) must be multiplied by the M×L Fourier matrix, $$e^{2\pi j\left(\frac{lm}{M}\right)}.$$

This inverse filter is given by $$h(l) = \frac{1}{M} \sum_{m=0}^{M-1} D(f)e^{2\pi j\left(\frac{lm}{M}\right)}, \quad (3)$$

$$l \in [0, L-1],$$

$$m \in [0, M-1]$$

Finally, the convolution with the chip waveform must be taken into account by up-sampling h by $T_p f_s$, where $T_p$ is the encoding chip spacing in the coded excitation waveform, and convolving it with the decoding chip waveform, p.

$$g(n) = \sum_{l=0}^{L-1} h(l)p(-n + lT_p f_s) \quad (4)$$

Figure 5:
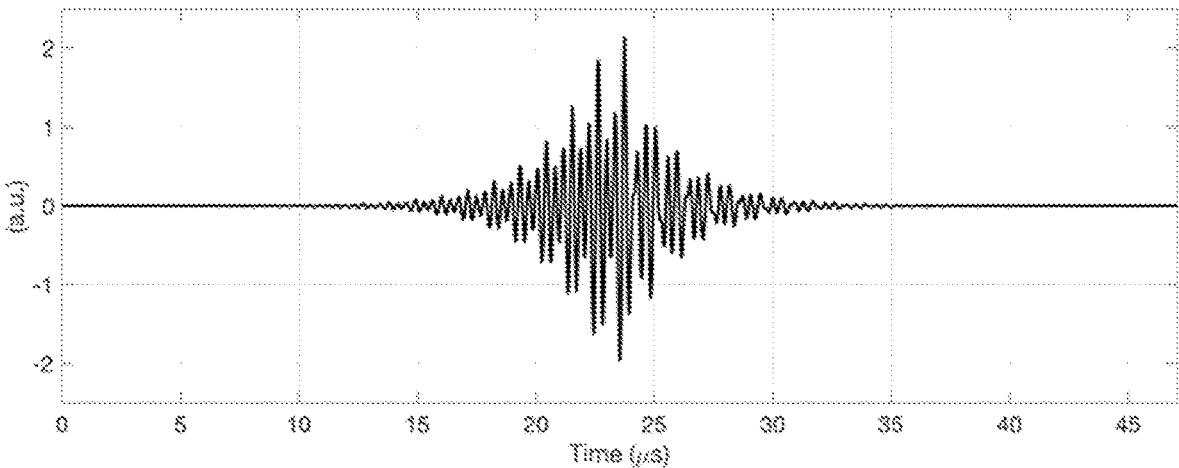
FIG. 5 show a 128-tap decoding filter for a 3×3 compound Barker code according to embodiments of the invention.

The final decoding filter is given by Equation (4). This filter serves as an inverse filter (approximation) for the binary code and a matched filter for the chip, effectively performing complete code compression and range lobe suppression. An exemplary 128-tap decoding filter for a 3×3 compound Barker code is shown in FIG. 5. Note that this is not the same as filtering with Equation (3) and then performing matched filtering. In order to completely suppress the range lobes, the up-sampling of the decoding filter as shown in Equation (4) must be included. The convolution with the chip pulse is optional but recommended to increase the SNR gain.

Earlier it was alluded to that specific details of the formation of the decoding filter require that the binary code be skew-symmetric. It is the up-sampling in Equation (4) that specifically requires this. If Equation (3) were used to decode instead, then non-skew-symmetric sequences could be used as well. However, this is not particularly useful because while the range lobes would be suppressed, the resulting point-spread function would not be the chip pulse but rather the chip pulse convolved with the binary code. In other words, axial resolution would not be recovered and an SNR gain would not be achieved. This highlights the importance of skew-symmetry in the selection of the binary code. In addition, it is worth noting that, if the binary code were transmitted directly without first up-sampling it and convolving it with a chip waveform (as is common in communications applications), then Equation (3) would suffice for decoding as opposed to Equation (4), meaning that non-skew-symmetric binary invertible sequences could be used as well. However, this approach could not be used in applications such as ultrasound, active sonar, radar, or LIDAR which use transmitters with a specific bandwidth that must be respected.

Figure 6:
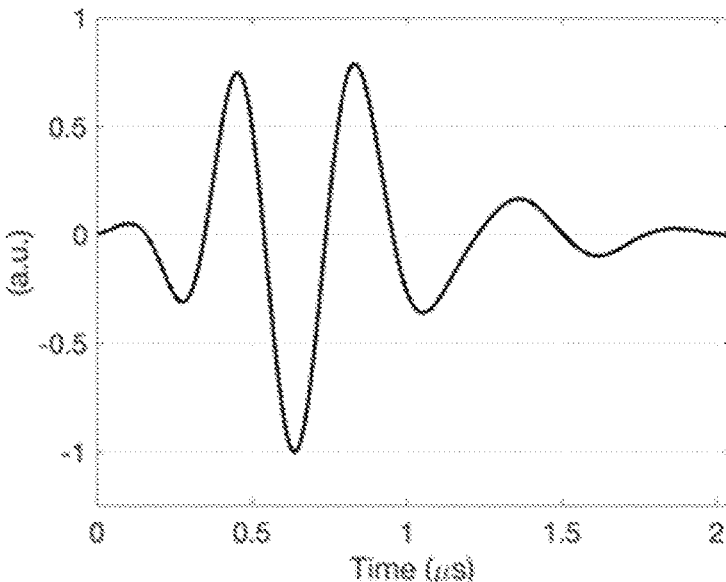
FIG. 6 shows an exemplary impulse response at 12.5 MHz according to embodiments of the invention. Note that the period of a sinusoid at 12.5 MHz is $$\frac{2\pi}{f_0} = 0.5027 \mu s.$$

Chip for Decoding: In one embodiment, the decoding chip waveform that was used to construct the decoding filter is different from the idealized tri-state voltage signal shown in FIG. 2 that was used to construct the coded excitation waveform. The decoding chip waveform for the decoding filter takes into account the impulse response of the ultrasound transducer itself. An example of a realistic impulse response at 12.5 MHz is shown in FIG. 6. It is important to take this into account because the acoustic wave that is transmitted is the convolution of the impulse response and the coded excitation waveform voltage signal and not just the voltage signal itself. Since the impulse response of a typical piezoelectric transducer has some ring-down, as is evident in FIG. 6, the duration of the true impulse response is longer than the duration of the voltage excitation signal. However, in some embodiments, it is important that in Equation (4), the variable $T_p$ is still set to the exact length of the voltage excitation signal and not the length of the impulse response. The impulse response can be measured with a hydrophone in a water tank. For use in Equation (4), it must be sampled at the same frequency, $f_s$. FIG. 6 shows an exemplary impulse response at 12.5 MHz. Note that the period of a sinusoid at 12.5 MHz is $$\frac{2\pi}{f_0} = 0.5027\mu s.$$

Briefly, even though the voltage excitation would only last for about 0.5 µs for this frequency, the transducer would ring for about 2 µs, as shown in FIG. 6.

Application of the Decoding Filter

The decoding filter derived in the previous section is applied by convolution along the first dimension of the data which is the axial dimension. Care must be taken to ensure the sampling frequency of the decoding filter matches the axial sampling frequency of the data. In one embodiment, the decoding filter is generated at a sampling frequency $f_s$ equal to the clock rate of the ultrasound scanner which is about 250 MHz and the ultrasound channel data is up-sampled to about 250 MHz using cubic spline interpolation before decoding. After decoding, the data may be down-sampled to their original sampling frequency again using cubic spline interpolation (or similar).

As shown in FIG. 7, decoding can be performed on the raw channel data (prior to beamforming) or it can be applied to the beamformed RF (radiofrequency) data, i.e., after delaying the channel data and summing across the channels, but prior to envelope detection and log compression. The advantage of performing decoding on the beamformed data is that the size of the data has been reduced by orders of magnitude (depending on the number of channels/elements in the ultrasound transducer) which reduces computational complexity, but beamforming before code compression can introduce distortions that can degrade code compression, particularly in the near-field. Note that the decoding filter derived for the present embodiment is intended to be applied to real-valued data and not complex-valued base-band data (i.e., after demodulating by the center frequency). However, an alternative embodiment for complex-valued data could be constructed as well (Zhao 2007).

An example of application of this decoding filter with a 7×7 compound Barker code for a simulated point target is shown in FIG. 8. For comparison, matched filtering and an uncoded approach that used only the chip waveform are shown as well. Left panel shows amplitude plots of a point target with the proposed decoding approach for pulse compression ("inverse"), matched filtering for pulse compression ("matched"), and an uncoded transmission ("uncoded") that used the chip waveform only. The two coded excitation approaches demonstrate a factor of 49 amplitude gain corresponding to the length of the code used. Matched filtering results in range lobes that are not present with inverse filtering. Right panel shows the same amplitude plots as on the left but displayed on a log scale and with their maxima shifted to 0 dB. Pulse compression is able to recover axial resolution of the main lobe. Matched filtering again shows very high range lobes at $10 \log_{10}(7)=-8.45$ dB, whereas inverse filtering is able to suppress them completely. From these plots, it is evident that the proposed decoding approach is able to completely suppress range lobes and recover axial resolution in simulation.

SNR Gain Calculation

It was discussed previously that the ideal SNR gain should be $10 \log_{10}$(code length). To clarify, this would be the SNR gain between an uncoded transmit processed with matched filtering and a coded transmit processed with the proposed decoding filter in Equation (4). If data acquired with the proposed coded excitation framework is compared to uncoded data that has not been processed with a matched filter, then the SNR gain will be larger than $10 \log_{10}$(code length) due to the additional gain from the matched filtering aspect of the proposed decoding filter. The SNR is calculated according to $$SNR = 10 \log_{10} \frac{\rho}{1-\rho} \qquad (5)$$

where $\rho$ is the normalized cross-correlation (NCC) estimate computed across the frame dimension (Friemel 1998).

FIG. 9 shows a SNR gain as a function of code length in physical phantom imaging (CIRS, Norfolk, VA) with a P4-2v transducer (2.72 MHz) and a Verasonics Vantage 128 ultrasound scanner (Kirkland, WA). SNR was calculated based on Equation (5), where $\rho$ is the NCC estimate computed across 100 frames with a 1000 Hz pulse repetition frequency (PRF). The SNR gain was calculated by subtracting the SNR of uncoded data from the SNR of the coded excitation data after pulse compression. The uncoded transmit was the single-cycle sine wave chip waveform. Note that, when comparing SNR in this fashion, the upper limit of the SNR gain is higher than $10 \log_{10}$(code length) due to the added gain of the matched filter that is incorporated in the decoding filter.

Among other things, this invention can find widespread applications in ultrasound imaging or sensing, active sonar, LIDAR, and/or radar. Due to the specific requirements of medical ultrasound, i.e., high dynamic range/contrast and low axial resolution, it is particularly useful in medical ultrasound field. Increasing SNR in medical ultrasound would be very useful for any application as it would improve the quality of the image as well as the effective penetration depth since attenuation is depth-dependent. It would be particularly useful in SNR-limited scenarios such as abdominal imaging of overweight or obese patients, transthoracic cardiac imaging, and transcranial imaging.

The unique part of the invention is, among other things, the combination of inverse filtering with a compound Barker coded excitation. It is the combined advantage of the compound Barker codes, which lead to high SNR gains, and the inverse filtering, which leads to low range lobes, that makes this approach ideal for medical ultrasound. Although the use of compound Barker codes and inverse filtering have both been reported separately in the literature, this work is the first to the inventors' knowledge to combine these two techniques for coded excitation in medical ultrasound imaging, radar, active sonar, and LIDAR.

One embodiment of the invention has been implemented on a Verasonics ultrasound scanner which is highly programmable for the purposes of research. The safety of the compound Barker coded transmit has been assessed and found to be well below the safety limits required by the FDA. This approach has been tested in vivo in six different healthy human subjects. It has been applied to imaging the liver, the heart, and the head. SNR gains have been measured in vivo and are in accordance with theoretical predictions for codes up to length 65. Longer codes may require more advanced hardware that is able to produce a more linear response to long coded excitation pulses in order to realize their full benefit.

The coded excitation and pulse compression scheme according to the invention has advantages over the following existing coded excitation approaches:

1) Standard Barker codes with either matched filtering, inverse filtering, or some other means of pulse compression. This approach has the disadvantage that the maximum achievable SNR gain is $10 \log_{10}(13)=11.13$ dB since the longest Barker code is 13 bits. This is much lower than what could be achieved with the compound Barker codes described herein.

2) Compound Barker codes with matched filtering or some other mismatched filtering other than inverse filtering for pulse compression. This has the disadvantage that the range lobes will be much higher than that of inverse filtering. For instance, with matched filtering, the range lobes will be at $-20*\log_{10}(13)=-22.28$ dB, which is far worse than the range lobe suppression that can be achieved using the inverse filtering approach described herein. Mismatched filtering can improve upon the range lobe suppression of matched filtering slightly at the cost of SNR gain. While there is a small loss in SNR gain from inverse filtering, it is a worthy tradeoff to get near-perfect range lobe suppression for medical ultrasound applications. In addition, with the compound Barker coded scheme that can offer much greater SNR gains, the loss of less than 1 dB in SNR gain due to inverse filtering is unimportant.

3) Complementary Golay codes have the disadvantage that they require two successive firings which reduces the frame rate. High frame rates are critical for blood flow imaging or imaging in high motion environments (e.g., cardiac imaging). If there is any motion in between complimentary Golay frames, the pulse compression will be adversely affected and the SNR gain will be reduced.

4) Chirps have the disadvantage that they require more sophisticated/expensive hardware to implement fully. In order to create a chirp, the transmitters need to have many different voltage levels (e.g., 128). Many scanners, such as the Verasonics, only have tri-state transmitters (i.e., $-1, 0, 1$). This makes it very difficult to implement chirps and trivial to implement phase encoded sequences such as Barker codes. While there are methods to implement "pseudo-chirps" on tri-state transmitters, these sequences are less efficient because a lot of the energy of the coded pulse is high frequency and outside the bandwidth of the transducer, meaning that it gets filtered out and ends up heating the transducer rather than being transmitted into the tissue. If the hardware to implement chirps is available, then historically they have been favored over Barker codes due to their superior SNR gains when processed with a matched filter. However, chirps do not have any advantages over this invention since greater SNR gains can be achieved with compound Barker coded sequences. Chirps also have nulls in their spectrum, meaning that inverse filtering cannot be performed in this case, resulting in higher sidelobes.

More specifically, the invention relates to method and system that utilize the coded excitation framework disclosed above for increasing SNR and suppressing range lobe artifacts in, for example, ultrasound imaging or sensing, active sonar, LIDAR, and/or radar.

In one aspect of the invention, the method includes forming the coded excitation waveform with an encoding chip waveform and a binary sequence; transmitting the coded excitation waveform into a medium of interest, and receiving signals generated from the medium of interest responsive to excitation of the coded excitation waveform; and performing pulse compression on the received signals using a decoding filter to increase the SNR and suppress the range lobe artifacts.

In some embodiments, the encoding chip waveform is an application-dependent pulse that defines an axial/range resolution of a system and fits within a bandwidth of a transmitter of the system. In some embodiments, in the encoding chip waveform is modulated in either frequency, phase, amplitude, or a combination of them. In some embodiments, the encoding chip waveform is a linear instantaneous frequency chirp signal.

In some embodiments, the binary sequence is an invertible skew-symmetric binary sequence. In some embodiments, the invertible skew-symmetric binary sequence is an odd-length Barker code, or a Kronecker product of two or more odd-length Barker codes.

In some embodiments, said forming the coded excitation waveform comprises convolving the encoding chip waveform with an up-sampled binary sequence. In some embodiments, the up-sampled binary sequence is generated by up-sampling the binary sequence by a factor that defines spacing of the encoding chip waveforms in the coded excitation waveforms. In some embodiments, the factor is greater than or equal to a length of the encoding chip waveform. In some embodiments, the factor is equal to the length of the encoding chip waveform.

In some embodiments, said performing the pulse compression comprises forming the decoding filter that serves as an inverse filter approximation for the binary sequence and a matched filter for the chip waveform.

In some embodiments, the decoding filter is a digital FIR filter. In some embodiments, the decoding filter is an L-tap FIR pseudo-inverse filter. In some embodiments, the decoding filter is formed using an inverse spectrum of the binary sequence with a truncated Fourier series. In some embodiments, the inverse filter approximation of the binary sequence is further up-sampled by the length of the encoding chip waveform. In some embodiments, the decoding filter is further convolved with a decoding chip waveform.

In some embodiments, the decoding chip waveform that is used is a measured impulse response of the transmitter and/or receiver.

In some embodiments, the decoding chip waveform is designed for a center frequency that is an integer multiple of the center frequency of the encoding chip waveform or the transmitted waveform.

In some embodiments, the decoding chip waveform is a measured impulse response of the receiver at the center frequency that is the integer multiple of the center frequency of the encoding chip waveform or the transmitted waveform.

In some embodiments, said forming the decoding filter comprises computing a discrete-time Fourier transform of the binary sequence to obtain a first spectrum; inverting the first spectrum and applying centering phase shifts on the inverted first spectrum based on a length of the binary sequence and a desired number of filter taps to obtain a second spectrum; performing an inverse discrete-time Fourier transform on the second spectrum to bring it back into the time domain to obtain a filter; and up-sampling the filter by the factor equal to or greater than the length of the encoding chip waveform used to construct the coded excitation waveform, and optionally convolving the up-sampled filter with the decoding chip waveform to form the decoding filter.

In some embodiments, said computing the discrete-time Fourier transform of the binary sequence, $C(f)$, comprises computing an M-point discrete-time Fourier transform of the binary sequence in the form of $$C(f) = \frac{1}{N} \sum_{n=0}^{N-1} c(n) e^{-2\pi j \left(\frac{f}{f_s}\right)n}, \quad \frac{-f_s}{2} \leq f < \frac{f_s}{2}$$

where c is the binary sequence, N is length of the binary sequence, f is a frequency that has M evenly spaced samples between $$-\frac{f_s}{2} \text{ and } \frac{f_s}{2},$$

$f_s$ is an axial sampling frequency; and multiplying the M×N Fourier matrix, $$e^{-2\pi j \left(\frac{f}{f_s}\right)n},$$

by the N×I binary sequence, c(n), via a matrix multiplication operation to obtain the first spectrum, $C(f)$, that is an M×I spectrum.

In some embodiments, the second spectrum comprises $$D(f) = \frac{1}{C(f)} \frac{e^{-j\pi\left(\frac{f}{f_s}\right)(L-1)}}{e^{j\pi\left(\frac{f}{f_s}\right)N}}$$

where L is the desired number of filter taps and M≥L>N.

In some embodiments, said performing the inverse discrete-time Fourier transform on the second spectrum comprises computing first L FIR filter coefficients, h(l), in the time domain by multiplying the second spectrum D(f) by an M×L Fourier matrix, $$e^{2\pi j \left(\frac{lm}{M}\right)},$$

in the form of $$h(l) = \frac{1}{M} \sum_{m=0}^{M-1} D(f) e^{2\pi j \left(\frac{lm}{M}\right)}, \quad l \in [0, L-1], \quad m \in [0, M-1]$$

In some embodiments, the decoding filter comprises $$g(n) = \sum_{l=0}^{L-1} h(l)p(-n + lT_p f_s)$$

wherein $T_p f_s$ is the up-sampling factor which is the product of the encoding chip spacing in the coded excitation waveform, $T_p$, and the axial sampling frequency, $f_s$, and p is the decoding chip waveform.

In some embodiments, the decoding chip waveform is a measured impulse response of a transmitter and/or receiver.

In some embodiments, the decoding filter is constructed for real-valued or complex-valued data.

In some embodiments, the decoding filter is operably applied with a neural network.

In some embodiments, the method can be applied for ultrasound imaging or sensing, active sonar, LIDAR, and/or radar.

In another aspect of the invention, the system comprises a waveform generator configured to generate a coded excitation waveform with an encoding chip waveform and a binary sequence; a probe coupled to the waveform generator and configured to transmit the coded excitation waveform into a medium of interest, and to receive signals generated from the medium of interest responsive to excitation of the coded excitation waveform; and a signal processing unit coupled to the probe and configured to perform pulse compression on the received signals using a decoding filter to increase the SNR and suppress the range lobe artifacts.

In some embodiments, the coded excitation waveform is a convolution of the encoding chip waveform with an up-sampled binary sequence. In some embodiments, the up-sampled binary sequence is generated by up-sampling the binary sequence by a factor that defines spacing of the encoding chip waveforms in the coded excitation waveforms. In some embodiments, the factor is greater than or equal to a length of the encoding chip waveform. In some embodiments, the factor is equal to the length of the encoding chip waveform.

In some embodiments, the encoding chip waveform is an application-dependent pulse that defines an axial/range resolution of the system and fits within a bandwidth of the probe. In some embodiments, the encoding chip waveform is modulated in either frequency, phase, amplitude, or a combination of them. In some embodiments, the encoding chip waveform is a linear instantaneous frequency chirp signal.

In some embodiments, the binary sequence is an invertible skew-symmetric binary sequence. In some embodiments, the invertible skew-symmetric binary sequence is an odd-length Barker code, or a Kronecker product of two or more odd-length Barker codes.

In some embodiments, the probe comprises at least one transducer configured to transmit the coded excitation waveform into the medium of interest, and to receive signals generated from the medium of interest.

In some embodiments, the at least one transducer is operable in a pulse-echo sensing mode, and/or in a transmission sensing mode.

In some embodiments, the at least one transducer comprises one element or an array of elements.

In some embodiments, a phase or amplitude of the transmitted coded excitation pulse is either inverted or not inverted with respect to an immediately prior transmitted coded excitation pulse.

In some embodiments, the probe comprises one or more transmitters configured to transmit the coded excitation waveform into the medium of interest, and one or more receivers configured to receive signals generated from the medium of interest. In some embodiments, the one or more receivers are configured to receive the signals that are echoed or backscattered of the transmit coded excitation waveform from the medium of interest.

In some embodiment, the probe is operable in a pulse-echo sensing mode, and/or in a transmission sensing mode.

In some embodiments, multiple transmitting/receiving events operably occur, each transmitting event utilizing one or more of the one or more transmitters, each receiving event utilizing some or all of the one or more receivers, and all or some received signals sets being combined for processing. In some embodiments, the multiple transmitting/receiving events occur in which the phase or amplitude of the transmitted coded excitation pulse is either inverted or not inverted with respect to an immediately prior transmitted coded excitation pulse.

In some embodiments, the decoding filter is configured to serve as an inverse filter approximation for the binary sequence and a matched filter for the chip waveform.

In some embodiments, the decoding filter is a digital FIR filter. In some embodiments, the decoding filter is an L-tap FIR pseudo-inverse filter. In some embodiments, the decoding filter is formed using an inverse spectrum of the binary sequence with a truncated Fourier series. In some embodiments, the inverse filter approximation of the binary sequence is further up-sampled by the length of the encoding chip waveform. In some embodiments, the decoding filter is further convolved with a decoding chip waveform.

In some embodiments, the decoding chip waveform the impulse response of the probe.

In some embodiments, the decoding chip waveform is designed for a center frequency that is an integer multiple of the center frequency of the encoding chip waveform or the transmitted waveform.

In some embodiments, the decoding chip waveform is a measured impulse response of the receiver at the center frequency that is the integer multiple of the center frequency of the encoding chip waveform or the transmitted waveform.

In some embodiments, the system is an ultrasound imaging or sensing system, an active sonar, an LIDAR system, and/or a radar.

The methods and systems described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, optical storage, a random-access memory (RAM), a read-only memory (ROM), an electrically erasable programmable ROM (EEPROM), combinations of the aforementioned types of computer-readable media, or any other medium that can be used to store computer executable code in the form of instructions or data structures that can be accessed by a computer.

These and other aspects of the present invention are further described below. Without intent to limit the scope of the invention, exemplary instruments, apparatus, methods and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

Example 1

Compound Barker-Coded Excitation for Increased Signal-to-Noise Ratio and Penetration Depth in Transcranial Ultrasound Imaging Many ultrasound exams fail due to poor image quality. One cause is insufficient SNR at depth, a limitation that is prevalent in many clinical applications due to thick abdominal walls or the presence of bone such as ribs or the skull. Coded excitation can be used to increase SNR within FDA safety limits and without contrast agents. As disclosed above, by applying the method to design binary coded pulses of arbitrary length along with a pulse compression technique, range lobes can be completely suppressed, thereby recovering axial resolution and improving SNR by as much as a factor of $10 \log_{10}$(code length).

Binary codes can be implemented within the hardware constraints of standard ultrasound platforms and do not require additional transmits. The longest known Barker code is 13 bits, which leads to sidelobes at −22 dB after matched filtering and makes them less useful for diagnostic ultrasound where high dynamic range is desired. An alternative approach is to use inverse filtering instead since Barker codes greater than 2 bits have no zeros in their spectrum. This eliminates the range lobes, but the SNR gain is still modest. In this exemplary example, it is shown that Barker codes can be compounded via the Kronecker product to create much longer sequences that also have no nulls in their spectrum and can provide greater SNR benefits on the order of $10 \log_{10}$(code length). SNR gain of compound Barker codes in phantoms and in transcranial imaging was shown qualitatively and quantitatively. The SNR gain was calculated using Equation (5).

FIG. 10 shows CIRS phantom (a 0.7 dB/cm/MHz) without and with 5×5 compound Barker coded excitation. Example B-Mode images of a CIRS phantom (CIRS, Norfolk, VA) with an uncoded transmit (single-cycle sine wave chip waveform) and a 5×5 bit compound Barker coded excitation transmit. Both images are displayed on the same dynamic range. This example showcases the coded excitation framework on physically acquired data, indicating that the pulse compression scheme is able to recover axial resolution and achieve an SNR gain. The SNR gain is evidenced by the brighter overall appearance of the coded image versus the uncoded one as well as the improved visibility of the deepest point targets indicated by the gold arrows. The SNR gain was 11.3 dB.

FIG. 11 shows transcranial imaging on healthy adult male without and with 5×5 compound Barker coded excitation. Images were acquired at the temporal acoustic window in the transverse plane. Both images are displayed on a dynamic range of 70 dB with an imaging depth of 16 cm. The uncoded transmit used a single-cycle sine wave chip waveform and the coded transmit used 5×5 bit compound Barker coded excitation. This example showcases the coded excitation framework on in vivo data, indicating that the coded excitation framework is robust to high amounts of noise, attenuation, clutter, and other sources of image degradation present in transcranial imaging. The SNR gain is evidenced by the brighter overall appearance of the coded image versus the uncoded one especially at deeper depths that have experienced more attenuation. The SNR gain was 12.61 dB.

The SNR gain (dB) using 5 bit, 13 bit, and 5×5 bit codes were 6.42±0.06, 10.09±0.32, and 11.32±0.56 in the phantom (N=2) and 2.96±0.43, 3.03±0.65, and 3.14±0.51 in transcranial imaging (N=34), as listed in Table 1. These gains were calculated via normalized cross-correlation (NCC). The NCC approach underestimated SNR gain in vivo due to a low PRF and out of plane motion, so the amplitudes in bright ROIs were compared, resulting in gains of 4.60±1.33, 11.55±3.87 and 12.64±2.23 dB. The phantom and in vivo results agree with expected gains of 7, 11, and 14 dB.

TABLE 1

| | SNR gain (dB) using 5 bit, 13 bit, and 5 × 5 bit codes. | | | |
| --- | --- | --- | --- | --- |
| Code Length | Phantom, N = 2 (NCC) | In vivo, N = 34 (NCC) | In vivo, N = 34 (Amplitude comparison) | Theoretical SNR Gain |
| 5 | 6.42 ± 0.06 dB | 2.96 ± 0.43 dB | 4.60 ± 1.33 dB | 7 dB |
| 13 | 10.09 ± 0.32 dB | 3.03 ± 0.65 dB | 11.55 ± 3.87 dB | 11 dB |
| 25 | 11.32 ± 0.56 dB | 3.14 ± 0.51 dB | 12.64 ± 2.23 dB | 14 dB |

Example 2

Coded Excitation Framework for Increased Signal-to-Noise Ratio of In Vivo Ultrasound Power Doppler Imaging Ultrasound power Doppler imaging is a useful clinical tool for measuring perfusion. Sensitivity to slow moving blood flow is important for many clinical applications, but thick abdominal walls or the presence of bone such as ribs or the skull cause significant attenuation and thereby reduce the SNR and flow sensitivity.

In the exemplary embodiment, the coded excitation framework is applied for increasing SNR of in vivo ultrasound power Doppler imaging. It is shown that this approach reliably improves the SNR of power Doppler imaging across a range of noise levels. As the noise level increases with respect to the blood, contrast and contrast-to-noise ratio are maintained with coded excitation whereas they drop precipitously without coded excitation. In vivo feasibility is also shown in transcranial and transthoracic cardiac B-Mode imaging. Both simulation and in vivo results match theoretical expectations of SNR gain. Finally, preliminary results showing in vivo power Doppler imaging in the liver are presented as well. Coded excitation is able to improve the blood vessel to background CNR and CR as compared to a standard approach.

Design of a coded excitation framework in medical ultrasound must take several factors into consideration, including the SNR gain, the range lobe levels, the complexity of implementation, and robustness to motion and frequency-dependent attenuation. The approach described herein optimizes for these design considerations. Long, compound Barker codes are used instead of standard Barker codes to provide larger SNR gains, inverse filtering is used instead of matched or mismatched filtering for greater range lobe suppression, single-transmit phase encoding is used instead of multiple-transmit phase encoding (i.e., Golay codes) for reduced sensitivity to motion, and phase modulation is used instead of frequency modulation (i.e., chirps) for simplicity and ease of implementation. In particular, this framework can be easily implemented on most ultrasound scanners such as the Verasonics that only have tri-state pulsers as opposed to multi-state pulsers. Although the use of compound Barker codes and inverse filtering have both been reported separately in the literature, this work is the first to the inventors' knowledge to combine these two techniques for coded excitation in medical ultrasound.

Principles of Coded Excitation Framework: To create the phase encoded excitation waveform, a long binary code is first created by computing the Kronecker product of two Barker codes. This compound code is then up-sampled and convolved with an encoding chip pulse to create a phase encoded excitation waveform. The encoding chip is a base pulse that fits within the bandwidth of the transducer and defines the axial resolution. In this case it is a single cycle sinusoid. In order to have near-perfect range lobe suppression, an inverse filtering approach is used instead of a traditional matched filter. As disclosed above, Barker codes longer than 2 bits as well as the Kronecker product of such Barker codes have this property. For example, the discrete Fourier transform of a 5×5 (25 bit) compound Barker code is shown in Panel b of FIG. 4 (note the code was zero-padded before computing the DFT). Since this binary code has full spectral support, a stable L-tap FIR filter can be designed to approximate the inverse spectrum. The inverse spectrum is also up-sampled and convolved with the decoding chip waveform to create the final decoding filter which serves as an inverse for the phase encoding and a matched filter for the chip waveform. In Panel c of FIG. 4, a 128 tap filter is shown for a 5×5 compound Barker code and a 2.7 MHz single cycle sine wave chip. The longer the binary code, the more taps are needed. By convolving this decoding filter with the received data in the time domain, pulse compression is achieved as shown in FIG. 7. For comparison, FIG. 7 also shows the matched filter results and results of a standard, uncoded approach in which only the chip waveform was transmitted. In the left panel of FIG. 7, it is clear that the matched filter and the inverse filter achieve an amplitude gain of 25 with respect to the uncoded approach, corresponding to the time-bandwidth product of the coded excitation. From the right panel of FIG. 7, it is clear that the matched filtering approach produces very high undesirable range lobes at about −10 dB. The axial resolution of all three approaches is equivalent, demonstrating perfect pulse compression in this idealized scenario. Note that in the right panel of FIG. 7, the pulses were shifted such that their maxima were all at 0 dB.

Field II Blood Flow Simulations: To simulate blood flow imaging with coded excitation, Field II simulations were performed using Matlab©. A 20×10×35 mm scattering phantom with 16 scatterers per resolution cell was created with a 2 mm diameter blood vessel angled at 45° from the transducer surface. The blood flow was parabolic with a peak velocity of 6 cm/s. The blood-to-tissue level was −60 dB. Gaussian noise was also added at noise-to-blood levels of −20, −10, 0, 10, and 20 dB with respect to the uncoded image. Imaging with a 128-element array (pitch=λ/2) was simulated for a 7 MHz imaging frequency and a $20f_0$ MHz sampling frequency. A plane wave synthetic aperture sequence was used with angles from −8° to 8° spaced by 2°. The final frame rate was 1 kHz and the total scan time was 0.1 s, corresponding to 100 slow-time acquisitions. The excitation waveforms used were a single cycle sine wave (baseline uncoded approach) and a 5×5 compound Barker code. A 128-tap FIR pseudo-inverse filter was used for decoding. Decoding was performed before beamforming. Clutter filtering was performed after beamforming with a $6^{th}$ order Chebyshev IIR filter with a cutoff of 2 Hz.

Phantom and in vivo B-Mode Data Acquisition: To demonstrate feasibility of applying this coded excitation scheme to physically acquired data, a CIRS phantom was scanned with and without coded excitation. The excitation waveforms used were a single cycle sine wave (uncoded approach), a 5 bit Barker code, a 13 bit Barker code, and a 5×5 (length 25) compound Barker code. All excitation waveforms had matched $ISPPA_{0.3}$ and the acoustic output of all sequences was measured with a hydrophone to ensure compliance with FDA safety guidelines. A 128-tap FIR filter was used when decoding. A 64-element P4-2v phased array (300 μm pitch) operating at 2.7 MHz and a Verasonics Vantage 128 system were used for imaging. The transmit focus was 8 cm and dynamic receive beamforming was applied. Ten frames were acquired in order to estimate SNR via normalized cross-correlation.

To further showcase the robustness of this framework to high noise in vivo imaging environments, transcranial B-Mode imaging was performed on five healthy adult subjects using the same sequences and parameters as specified above. Transthoracic cardiac B-Mode imaging was also performed on one healthy adult subject with an imaging frequency of 4.7 MHz. However, due to a low PRF and unmitigated out-of-plane subject/sonographer motion in these in vivo images, normalized-cross correlation estimates were far lower than expected and did not match qualitative assessments of SNR gain. In order to estimate the SNR gain for these in vivo cases, the amplitudes within bright ROIs in the skull and myocardial wall were also compared.

In vivo Power Doppler Data Acquisition: In vivo blood flow data was also acquired in the liver of a healthy adult subject. The excitation waveforms used were a single cycle sine wave (uncoded approach) and a 5×5 (length 25) compound Barker code. A 128-tap FIR filter was used for decoding. A 50 mm L12-5 linear array (195.3 μm pitch) operating at 5.2 MHz and a Verasonics Vantage 128 system were used for imaging. Only the first 128 of the 256 elements were used for transmit and receive. The imaging depth was 4 cm. A focused B-Mode image (2 cm transmit focus) was acquired for targeting purposes as well as a time series of plane wave synthetic aperture (PWSA) frames to measure blood flow. The PWSA sequence consisted of 320 frames of 16 angles from −7° to 8° degrees with a final PRF of 1 kHz, corresponding to a total scan time of 320 ms for the PWSA sequence. Clutter and noise filtering were performed with a singular value decomposition similar to the approach in Baranger, J. et al., (2018). Coded and uncoded images were acquired in quick succession, but due to subject breathing and sonographer hand motion, the FOVs between each image were not perfectly matched.

Image Quality Assessment: In order to quantify the image quality improvements from coded excitation, the blood vessel to background contrast-to-noise ratio (CNR) and contrast ratio (CR) were computed according to Equations (6) and (7), respectively. Note that these metrics were computed after clutter filtering. SNR was calculated on the enveloped data before clutter filtering according to Equation (5). For the in vivo and physical phantom images, ρ was estimated via normalized cross-correlation (NCC).

$$CNR = \frac{|S_i - S_o|}{\sqrt{\sigma_i^2 + \sigma_o^2}} \tag{6}$$

-continued $$CR = 10 \log_{10}\left(\frac{\mu_i}{\mu_0}\right) \tag{7}$$

Field II Blood Flow Simulation Results: The results of the Field II blood flow simulations are shown in FIG. 12, where Panel a is a B-Mode image of blood vessel with ROIs used to calculate image quality metrics, Panels b-f are power Doppler images with an uncoded transmit at 20, 10, 0, −10, and −20 dB blood-to-noise ratios, and Panels g-k are corresponding 25 bit coded excitation power Doppler images. All images shown on same spatial scale. All power Doppler images shown with same color map. Qualitatively, the coded excitation images show much higher and more consistent contrast and CNR across noise levels, showing the advantage of using coded excitation in high noise environments. The individual CNR and CR metrics are provided in each of the power Doppler images, as shown in Panels b-k of FIG. 12. Excluding the matched filter gain from the chip portion of the decoding filter, the SNR gains for the 20, 10, 0, −10, and −20 dB blood-to-noise images were 12.89, 12.91, 12.93, 12.91, 12.91, respectively, indicating that this technique is able to produce a reliable SNR gain across varying noise levels. The theoretical SNR gain should be 10 $\log_{10}(25)$ =13.98 dB. The remaining about 1 dB of unrealized gain could be due to inefficiencies in inverse filtering or slight imperfections in code compression, but these results still agree well with theoretical expectations.

FIG. 13 shows the CNR, CR, and SNR of coded versus uncoded approaches across the same range of blood-to-noise levels. Panel a shows contrast-to-noise ratio between the blood vessel and the background calculated on the clutter filtered power Doppler image according to Equation (6). Panel b shows contrast ratio between the blood vessel and the background calculated on the clutter filtered power Doppler image according to Equation (7). Panel a shows the SNR calculated on the enveloped data before clutter filtering according to Equation (5). The SNR gain is constant across noise levels. However, the contrast and CNR gains are greater the higher the noise levels are with respect to the blood. These results highlight the benefit of using coded excitation in high noise environments such as in difficult-to-image patients and in particularly challenging scenarios such as imaging through the bone.

Phantom and in vivo B-Mode Results: Qualitative SNR gains in a CIRS phantom and a representative human subject are shown in FIG. 4. The SNR gains (dB) using 5 bit, 13 bit, and 5×5 bit codes were 6.42±0.06, 10.09±0.32, and 11.32±0.56 in the phantom (N=2) and 2.96±0.43, 3.03±0.65, and 3.14±0.51 in transcranial imaging (N=34). The NCC approach underestimated SNR gain in vivo due to a low PRF and unmitigated out-of-plane motion, so the amplitudes in bright ROIs were compared, resulting in gains of 4.60±1.33, 11.55±3.87 and 12.64±2.23 dB. The phantom and in vivo results agree with expected gains of 7, 11, and 14 dB.

Qualitative comparison of uncoded and 5×5 compound Barker coded excitation approaches are shown in FIGS. 10-11. FIG. 10 is B-Mode images of the CIRS phantom. FIG. 11 is B-Mode images of transcranial ultrasound at the temporal window (transverse plane) in a healthy adult male subject. All images shown on same dynamic range.

Transthoracic cardiac B-Mode images are shown in FIG. 14, where the coded approach is a 25 bit compound Barker code. Similar to the transcranial images, the NCC approach underestimated SNR gain due to a large amount of unmitigated out-of-plane motion, so amplitudes within the myocardial wall were compared instead, resulting in a gain of 12.04 dB. This result is comparable to the transcranial results and is in line with theoretical expectations.

In vivo Blood Flow Results: Finally, to achieve the goal of this work and demonstrate the utility of coded excitation for in vivo power Doppler imaging, in vivo liver results are shown in FIG. 15. Gray scale images depict the focused B-Mode images used for targeting. The red dashed boxes indicate the region of the PWSA data that was processed to form power Doppler images, shown in color. In the power Doppler images, green dashed boxes indicate background ROIs and blue solid boxes indicate blood vessel ROIs used for calculating CNR and contrast according to Equations (6) and (7). Power Doppler color bar range is 10 dB in all cases. The focused B-Mode images along with power Doppler images generated from 50 and 100 frames are shown. The CNR and contrast ratio statistics calculated from the ROIs indicated in FIG. 15 are shown in Table 2. From these results it can be seen that, while both uncoded and coded excitation acquisitions benefited from using more frames in the power Doppler image formation, the coded excitation acquisition was able to produce a larger benefit in both CNR and CR in the 50 frame scenario where SNR and blood flow sensitivity are lower. Although this shallow imaging environment is not particularly challenging, in deeper imaging through more difficult-to-image patients, the benefits of coded excitation would be even more apparent.

TABLE 2

| Comparison of CR and CNR values for in vivo blood flow imaging | | | | | | |
|---|---|---|---|---|---|---|
| | Uncoded | | Coded | | Gain | |
| Frames | CR | CNR | CR | CNR | CR Gain | CNR Gain |
| 50 | 2.607 dB | 1.840 | 5.180 dB | 2.547 | 2.574 dB | 0.707 |
| 100 | 4.460 dB | 2.692 | 5.128 dB | 3.396 | 0.668 dB | 0.704 |

In sum, the exemplary example demonstrated a novel coded excitation framework for improving the SNR of ultrasound power Doppler imaging that can realize large SNR benefits without compromising axial resolution, contrast, or hardware complexity, unlike previous approaches. Field II simulations were used to predict the benefits that could be realized for power Doppler imaging, highlighting that 1) this approach is able to reliably increase SNR up to theoretical expectations, and 2) coded excitation provides more benefit to CNR and CR in high noise environments. The exemplary example also showed feasibility of in vivo application of the coded excitation framework with transcranial and transthoracic B-Mode imaging and demonstrated SNR gains that approach theoretical expectations. Finally, preliminary results of increased CR, CNR, and sensitivity to blood flow were demonstrated due to coded excitation in in vivo power Doppler imaging of transabdominal liver imaging. Collectively, the results presented herein suggest that a coded excitation framework consisting of compound Barker codes with inverse filtering pulse compression is a promising platform for increasing the SNR and sensitivity to blood flow signal in challenging in vivo imaging scenarios.

The foregoing description of the exemplary embodiments of the invention has been presented only for the purposes of illustration and description and is not intended to be exhaustive or to limit the invention to the precise forms disclosed. Many modifications and variations are possible in light of the above teaching.

factor equal to or greater than the length of the encoding chip waveform used to form the coded excitation waveform.

14. The method of claim 1, wherein the decoding chip waveform is a measured impulse response of the transmitter and/or receiver, wherein the transmitter emits the coded excitation waveform into a medium and the receiver receives the signals generated from the medium responsive to excitation of the coded excitation waveform, wherein the transmitter and receiver are the same entity or multiple entities.

15. The method of claim 1, wherein said forming the decoding filter comprises:
   computing a discrete-time Fourier transform of the binary sequence to obtain a first spectrum;
   inverting the first spectrum and applying centering phase shifts on the inverted first spectrum based on a length of the binary sequence and a desired number of filter taps to obtain a second spectrum;
   performing an inverse discrete-time Fourier transform on the second spectrum to bring it back into the time domain to obtain a filter, wherein the time domain refers to the original domain in which the signal was sampled over units of time; and
   up-sampling the filter by a factor equal to or greater than the length of the encoding chip waveform used to construct the coded excitation waveform.

16. The method of claim 15, wherein said forming the decoding filter further comprises:
   convolving the up-sampled filter with a decoding chip waveform to form the decoding filter.

17. The method of claim 15, wherein said computing the discrete-time Fourier transform of the binary sequence comprises:
   computing an M-point discrete-time Fourier transform of the binary sequence, C(f), in the form of $$C(f) = \frac{1}{N}\sum_{n=0}^{N-1} c(n)e^{-2\pi j\left(\frac{f}{f_s}\right)n}, \quad \frac{-f_s}{2} \le f < \frac{f_s}{2}$$

where c is the binary sequence, N is length of the binary sequence, f is a frequency that has M evenly spaced samples between $$-\frac{f_s}{2} \text{ and } \frac{f_s}{2},$$

$f_s$ is an axial sampling frequency; and
   multiplying the M×N Fourier matrix, $$e^{-2\pi j\left(\frac{f}{f_s}\right)n},$$

by the N×I binary sequence, c(n), via a matrix multiplication operation to obtain the first spectrum, C(f), that is an M×I spectrum.

18. The method of claim 15, wherein the second spectrum comprises $$D(f) = \frac{1}{C(f)}\frac{e^{-j\pi\left(\frac{f}{f_s}\right)(L-1)}}{e^{j\pi\left(\frac{f}{f_s}\right)N}}$$

where L is the desired number of filter taps and M≥L>N.

19. The method of claim 15, wherein said performing the inverse discrete-time Fourier transform on the second spectrum comprises:
   computing the first L FIR filter coefficients, h(l), in the time domain by multiplying the second spectrum D(f) by an M×L Fourier matrix, $$e^{2\pi j\left(\frac{lm}{M}\right)},$$

in the form of $$h(l) = \frac{1}{M}\sum_{m=0}^{M-1} D(f)e^{2\pi j\left(\frac{lm}{M}\right)}, \quad l \in [0, L-1], \quad m \in [0, M-1].$$

20. The method of claim 15, wherein the decoding filter comprises $$g(n) = \sum_{l=0}^{L-1} h(l)p(-n + lT_p f_s)$$

wherein $T_p f_s$ is the up-sampling factor which is the product of the encoding chip spacing in the coded excitation waveform, $T_p$, and the axial sampling frequency, $f_s$, and p is the decoding chip waveform.

21. The method of claim 1, wherein the decoding filter is constructed for real-valued or complex-valued data.

22. The method of claim 1, being applicable for ultrasound imaging or sensing, active sonar, light detection and ranging (LIDAR), and/or radar.

23. A method for increasing signal-to-noise ratio (SNR) and suppressing range lobe artifacts, comprising:
   forming a coded excitation waveform with an encoding chip waveform and a binary sequence, wherein the binary sequence is an invertible skew-symmetric binary sequence or the Kronecker product of two or more such sequences, wherein the Kronecker product of two sequences a=[$a_1, a_2, \ldots a_{Na}$] and b=[$b_1, b_2 \ldots b_{Nb}$] is defined as $$a \otimes b = (a_1 b, a_2 b, a_3 b, \ldots a_N b)$$

where the resulting sequence is of length $N_a \times N_b$;
   transmitting the coded excitation waveform into a medium of interest, and receiving signals generated from the medium of interest responsive to excitation from the coded excitation waveform; and
   performing pulse compression on the received signals using a decoding filter to increase the SNR and suppress the range lobe artifacts,
   wherein the decoding filter is convolved with a decoding chip waveform; and
   wherein the decoding chip waveform has a center frequency that is an integer multiple of the center frequency of the encoding chip waveform or the transmitted waveform.

24. The method of claim 23, wherein the decoding chip waveform is a measured impulse response of the receiver at the center frequency that is the integer multiple of the center frequency of the encoding chip waveform or the transmitted waveform, wherein the receiver receives the signals generated from the medium responsive to excitation of the coded excitation waveform.

25. The method of claim 24, wherein the decoding chip waveform is an impulse response of a transmitter and/or receiver.

26. A system for increasing signal-to-noise ratio (SNR) and suppressing range lobe artifacts, comprising:

a waveform generator configured to generate a coded excitation waveform with an encoding chip waveform and a binary sequence, wherein the binary sequence is an invertible skew-symmetric binary sequence or the Kronecker product of two or more such sequences;

a probe coupled to the waveform generator and configured to transmit the coded excitation waveform into a medium of interest, and to receive signals generated from the medium of interest responsive to excitation from the coded excitation waveform; and a signal processing unit coupled to the probe and configured to perform pulse compression on the received signals using a decoding filter to increase the SNR and suppress the range lobe artifacts, wherein the decoding filter is convolved with a decoding chip waveform, and configured to serve as an inverse filter approximation for the binary sequence and a matched filter for the chip waveform.

27. The system of claim 26, wherein the coded excitation waveform is a convolution of the encoding chip waveform with an up-sampled binary sequence.

28. The system of claim 27, wherein the up-sampled binary sequence is generated by up-sampling the binary sequence by a factor that defines the spacing of the encoding chip waveforms in the coded excitation waveform.

29. The system of claim 28, wherein the up-sampling factor is greater than or equal to a length of the encoding chip waveform.

30. The system of claim 29, wherein the up-sampling factor is equal to the length of the encoding chip waveform.

31. The system of claim 26, wherein the encoding chip waveform is an application-dependent pulse that defines an axial/range resolution of the system and fits within a bandwidth of the probe.

32. The system of claim 26, wherein in the encoding chip waveform is modulated in either frequency, phase, amplitude, or a combination of them.

33. The system of claim 32, wherein the encoding chip waveform is a linear instantaneous frequency chirp signal.

34. The system of claim 26, wherein the invertible skew-symmetric binary sequence is an odd-length Barker code, or a Kronecker product of two or more odd-length Barker codes.

35. The system of claim 26, wherein the probe comprises at least one transducer configured to transmit the coded excitation waveform into the medium of interest, and to receive signals generated from the medium of interest.

36. The system of claim 35, wherein the at least one transducer comprises one element or an array of elements.

37. The system of claim 36, wherein the at least one transducer is operable in a pulse-echo sensing mode, and/or in a transmission sensing mode.

38. The system of claim 35, wherein a phase or amplitude of the transmitted coded excitation pulse is either inverted or not inverted with respect to an immediately prior transmitted coded excitation pulse.

39. The system of claim 26, wherein the probe comprises one or more transmitters configured to transmit the coded excitation waveform into the medium of interest, and one or more receivers configured to receive signals generated from the medium of interest.

40. The system of claim 39, wherein the probe is operable in a pulse-echo sensing mode, and/or in a transmission sensing mode.

41. The system of claim 39, wherein the one or more receivers are configured to receive the echoed or backscattered signals of the transmit coded excitation waveform from the medium of interest.

42. The system of claim 39, wherein multiple transmitting/receiving events operably occur, each transmitting event utilizing one or more of the one or more transmitters, each receiving event utilizing some or all of the one or more receivers, and all or some received signals being combined for processing.

43. The system of claim 38, wherein multiple transmitting/receiving events in which a transmitter first transmits a coded excitation waveform into a medium and a receiver subsequently receives signals generated from the medium responsive to excitation of the coded excitation waveform occur and during in which the phase or amplitude of the transmitted coded excitation pulse is either inverted or not inverted with respect to an immediately prior transmitted coded excitation pulse.

44. The system of claim 26, wherein the decoding filter is a digital finite impulse response (FIR) filter.

45. The system of claim 26, wherein the decoding filter is an L-tap FIR pseudo-inverse filter.

46. The system of claim 45, wherein the decoding filter is formed using an inverse spectrum of the binary sequence approximated with a truncated Fourier series.

47. The system of claim 26, wherein the inverse filter approximation of the binary sequence is up-sampled by a factor equal to or greater than the length of the encoding chip waveform used to form the coded excitation waveform.

48. The system of claim 26, wherein the decoding chip waveform is a measured impulse response of the probe.

49. A system for increasing signal-to-noise ratio (SNR) and suppressing range lobe artifacts, comprising:

a waveform generator configured to generate a coded excitation waveform with an encoding chip waveform and a binary sequence, wherein the binary sequence is an invertible skew-symmetric binary sequence or the Kronecker product of two or more such sequences;

a probe coupled to the waveform generator and configured to transmit the coded excitation waveform into a medium of interest, and to receive signals generated from the medium of interest responsive to excitation from the coded excitation waveform; and a signal processing unit coupled to the probe and configured to perform pulse compression on the received signals using a decoding filter to increase the SNR and suppress the range lobe artifacts, wherein the decoding filter is convolved with a decoding chip waveform; and wherein the decoding chip waveform has a center frequency that is an integer multiple of the center frequency of the encoding chip waveform or the transmitted waveform.

50. The system of claim 49, wherein the decoding chip waveform is a measured impulse response of the receiver at the center frequency that is the integer multiple of the center frequency of the encoding chip waveform or the transmitted waveform, wherein the receiver receives signals generated from the medium of interest responsive to excitation of the coded excitation waveform.

51. The system of claim 26, wherein the system is an ultrasound imaging or sensing system, an active sonar system, a light detection and ranging (LIDAR) system, and/or a radar system.

* * * * *